(12) United States Patent
Darlix

(10) Patent No.: US 11,929,474 B2
(45) Date of Patent: Mar. 12, 2024

(54) BATTERY MODULE AND BATTERY PACK THERMAL CONTROL SYSTEM

(71) Applicant: TECHNOLOGIES VE INC., Saint-Joseph-du-Lac (CA)

(72) Inventor: Vincent Georges Pierre Darlix, Saint-Joseph-du-Lac (CA)

(73) Assignee: TECHNOLOGIES VE INC., Saint-Joseph-du-Lac (CA)

( * ) Notice: Subject to any disclaimer, the term of this patent is extended or adjusted under 35 U.S.C. 154(b) by 413 days.

(21) Appl. No.: 17/304,262

(22) Filed: Jun. 17, 2021

(65) Prior Publication Data

US 2021/0399355 A1  Dec. 23, 2021

Related U.S. Application Data

(60) Provisional application No. 63/039,989, filed on Jun. 17, 2020.

(51) Int. Cl.
| | |
|---|---|
| *H01M 10/613* | (2014.01) |
| *H01M 10/42* | (2006.01) |
| *H01M 10/44* | (2006.01) |
| *H01M 10/625* | (2014.01) |
| *H01M 10/633* | (2014.01) |

(Continued)

(52) U.S. Cl.
CPC ..... *H01M 10/613* (2015.04); *H01M 10/4257* (2013.01); *H01M 10/441* (2013.01); *H01M 10/443* (2013.01); *H01M 10/625* (2015.04); *H01M 10/633* (2015.04); *H01M 10/643* (2015.04); *H01M 10/6561* (2015.04); *H01M 10/6567* (2015.04); *H01M 10/663* (2015.04); *B60K 6/28* (2013.01); *B60L 50/64* (2019.02); *B60L 58/26* (2019.02); *B60Y 2200/91* (2013.01); *B60Y 2200/92* (2013.01);

(Continued)

(58) Field of Classification Search
CPC .......................... H01M 10/613; H01M 10/625
See application file for complete search history.

(56) References Cited

U.S. PATENT DOCUMENTS

| | | |
|---|---|---|
| 7,560,190 B2 | 7/2009 | Ahn et al. |
| 8,852,772 B2 | 10/2014 | McDonald |

(Continued)

FOREIGN PATENT DOCUMENTS

| | | |
|---|---|---|
| CN | 202550023 | 11/2012 |
| WO | 2017004078 A1 | 1/2017 |
| WO | 2020100152 A1 | 5/2020 |

OTHER PUBLICATIONS

CN202550023—Abstract-English Translation.

*Primary Examiner* — Robert Grant
(74) *Attorney, Agent, or Firm* — LAVERY, DE BILLY, LLP; Gonzalo Lavin

(57) ABSTRACT

A battery module comprising a plurality of cells and a casing comprising one or more cell-containing layers configured to house the cells is provided. The casing further comprises one or more cooling layers, such that each cooling layer is configured to contain the partial immersion cooling means in such a manner that said partial immersion cooling means are positioned directly around at least one electrode of the cells. A battery pack thermal management system for a vehicle comprising at least one of the battery modules is also provided, as well as a method of controlling the cell temperature of a battery module using said system.

37 Claims, 17 Drawing Sheets

(51) Int. Cl.
     *H01M 10/643*     (2014.01)
     *H01M 10/6561*     (2014.01)
     *H01M 10/6567*     (2014.01)
     *H01M 10/663*     (2014.01)
     *B60K 6/28*     (2007.10)
     *B60L 50/64*     (2019.01)
     *B60L 58/26*     (2019.01)

(52) U.S. Cl.
     CPC ..... *B60Y 2306/05* (2013.01); *B60Y 2400/112* (2013.01); *H01M 2010/4271* (2013.01); *H01M 2220/20* (2013.01)

(56) References Cited

U.S. PATENT DOCUMENTS

| | | |
|---|---|---|
| 9,184,477 B2 | 11/2015 | Jeong et al. |
| 9,527,403 B2 | 12/2016 | Mardall et al. |
| 9,692,095 B2 | 6/2017 | Harris |
| 9,692,096 B2 | 6/2017 | Harris |
| 9,893,385 B1 | 2/2018 | Nayar et al. |
| 9,966,780 B2 | 5/2018 | Sherstyuk et al. |
| 9,995,535 B2 | 6/2018 | Harris |
| 10,250,045 B2 | 4/2019 | Sherstyuk et al. |
| 10,369,899 B2 | 8/2019 | Hettrich et al. |
| 10,418,622 B2 | 9/2019 | Koch et al. |
| 10,826,140 B2 | 11/2020 | Harris et al. |
| 2016/0336623 A1 | 11/2016 | Nayar et al. |
| 2017/0288286 A1* | 10/2017 | Buckhout ........... H01M 50/519 |
| 2018/0237138 A1 | 8/2018 | Phan et al. |
| 2019/0312251 A1* | 10/2019 | Matthews ........... H01M 50/526 |
| 2020/0076006 A1* | 3/2020 | Bradwell ............. H01M 10/39 |

\* cited by examiner

BATTERY MODULE AND BATTERY PACK THERMAL CONTROL SYSTEM

CROSS-REFERENCE TO RELATED APPLICATIONS

This application claims benefit of U.S. patent application Ser. No. 63/039,989, filed on Jun. 17, 2020, which is incorporated herein in its entirety by reference.

FIELD OF THE INVENTION

The present invention relates generally to a battery module, as well as a thermal control system comprising said battery module, for use as an energy storage system for a vehicle, or other applications.

BACKGROUND TO THE INVENTION

The automotive market, from light vehicles to heavy-duty vehicles, is trending strongly towards electrification. For vehicles such as mild hybrids, hybrids or even plug-in hybrids (MHEV, HEV, PHEV), they are powered by a battery system combined with another power source, such as an internal combustion engine. Another hybrid variation is to use a battery combined with fuel cells to eliminate polluting gases. Finally, other electric vehicles are 100% battery electric vehicles (BEV), which will likely dominate the market in future years.

All of these types of electric vehicles require a traction battery that is made of a certain number of connected battery modules arranged in series and parallel to obtain respectively the voltage and current output needed for the application. These modules are themselves made of battery cells electrically connected in series and parallel to obtain the voltage and amperes needed. A myriad of different battery designs are possible, depending upon the application's requirements. The battery cells may be of different chemistry, such as lithium ion (NMC, NCA, LFP, etc.), nickel metal hydride, lead acid, etc.

Known in the art is the classic active thermal management system using a cooling plate with the cells mounted and usually glued using a thermal paste, or even potted, on top of it (as employed by companies such as GM). This system can accommodate all types of cells, namely prismatic, pouch and cylindrical cells. Another thermal management system uses ribbons going around the cylindrical cells, with a thermal and isolating pad interface (as employed by Tesla).

Some manufacturers use passive thermal management, but rarely. XING uses immersion cooling where the cells are directly in contact with the fluid, inside a plastic module. Alta Motors has used passive cooling with thermal paste on the cells, in conjunction with thermal material on the module (aluminum and copper).

For comparison, on one hand, General Motors (GM), with the Bolt, and Rivian, use cooling plate(s) with cells on top (axial cooling). On the other hand, Tesla uses cooling ribbons around the cells (radial cooling).

The Tesla battery uses a thermic pad and flat cooling pipes going around the cylindrical cells. The Tesla battery configuration provides good cooling capacity but increases the current imbalance inside each battery cell, which has the effect of precipitating the end of life and decreases the usable capacity (range of the vehicle).

The GM battery used in the Bolt uses a cooling plate that touches the bottom of each module comprised of pouch cells. The GM Bolt battery configuration does not provide enough cooling capacity, and it does not achieve significant charge / discharge power with cells optimized for energy capacity. The Volt model, however, uses a cooling jacket between each couple of cells, achieving a good cooling capacity, but inducing a temperature delta inside the cell.

The Rivian configuration uses a cooling plate on one side of the cylindrical cells. The Rivian configuration can keep each cell at the same temperature thanks to the axial cooling, but does not provide enough cooling capacity, and it does not achieve significant charge / discharge power with cells optimized for energy capacity.

Existing battery systems do not quite succeed in keeping a constant temperature throughout the whole battery pack and inside each battery module, nor do they succeed in keeping the cells from heating up, during high current draw or charge 2C), sustained full acceleration, or high-power recharge, for example. They also do not accept very high power recharge or discharge because of the cells' relatively high impedance ($\geq$25-30 m$\Omega$) during usage, due in part to their temperature and the delta temperature inside each cell (and SOC, SOH, cell construction) that are caused by the thermal management system topology inside the module and battery pack.

Part of the problem is that the standard complete HVAC active cooling system for battery packs (which are by far the most used in the automotive and commercial/heavy vehicle industries, except for the Nissan Leaf which is air cooled) do not transfer the heat from the cell efficiently.

For example, Tesla uses an aluminum cooling ribbon and between each individual cell and the ribbon, there is a thermal pad and some dielectric paste. In addition to limiting the cooling power due to these multiple interfaces, this prevents them from achieving a better energy density as the ribbon takes a lot of space, as well as the thermal pad, which is mandatory for electrical isolation.

There is a need for a cost efficient, safe, energy and power dense, robust and reliable battery module and complete pack to allow for the success of transport electrification, mainly for applications that require high power and high capacity at the same time (air transportation, motorsports, heavy/industrial vehicles, etc.).

SUMMARY OF THE INVENTION

In accordance with the present invention, there is provided:
1. A battery module comprising a plurality of cells and a casing comprising one or more cell-containing layers configured to house the cells, the casing further comprising one or more cooling layers, such that each cooling layer is configured to contain partial immersion cooling means in such a manner that said partial immersion cooling means are positioned directly around at least one electrode of the cells.
2. The battery module of item 1, wherein each cooling layer comprises a layer of sealing material comprising apertures that are dimensioned so as to sealingly receive the cells in such a manner that the cells come into direct contact with the partial immersion cooling means without the partial immersion cooling means leaking out of the cooling layer.
3. The battery module of item 1, wherein the casing comprises at least two cooling layers, wherein one of said at least two cooling layers is at a top of the casing and another of said at least two cooling layers is at a bottom of said casing.

4. The battery module of item 1, wherein the casing further comprises at least one holder to better secure the plurality of cells.
5. The battery module of item 1, wherein the partial immersion cooling means comprises dielectric liquid.
6. The battery module of item 1, wherein the battery module further comprises at least one of a PCB-current collector; one or more sensors; or one or more other PCBs (MMU/BMU/BMS).
7. The battery module of item 1, wherein each cooling layer comprises at least one port for circulating the partial immersion cooling means.
8. The battery module of item 1, wherein the battery module is configured to be operatively connected to a complete HVAC system external to the battery module.
9. The battery module of item 1, wherein the plurality of cells are electrically connected to each other on one side by means of ultrasonic welding, wire-bonding, or laser welding.
10. The battery module of item 1, wherein the partial immersion cooling means are configured to be recirculated around the cells of the battery module.
11. The battery module of item 1, wherein the casing of the battery module is constructed from an engineered polymer plastic that is either thermally insulant or thermally conductive.
12. The battery module of item 1, wherein each cell anode is immersed in the partial immersion cooling means up to 3-6 mm in height and each cell cathode is immersed in the partial immersion cooling means up to 10-15 mm in height.
13. The battery module of item 1, wherein the partial immersion cooling means is a dielectric liquid with a thermal conductivity of at least 0.10 or at least 0.15W/m*K.
14. The battery module of item 1, wherein at least one of the one or more cooling layers comprises micro cooling channels.
15. The battery module of item 1, wherein at least one of the one or more cell-containing layers is filled with helium.
16. The battery module of item 1, wherein the plurality of cells comprises two layers of cells contained in two cell-containing layers of the casing, and wherein the casing comprises three cooling layers configured to contain partial immersion cooling means, the first cooling layer being a top layer configured to cool cathodes of the first layer of cells, the second cooling layer being a middle layer located between the two cell-containing layers and configured to cool anodes of both layers of cells, and the third cooling layer being a bottom layer configured to cool cathodes of the second layer of cells, wherein said second cooling layer comprises an insulated plate configured to separate the two layers of cells.
17. The battery module of item 1, wherein the battery module is configured to be connected to other battery modules and/or to a central system using an HV and LV electrical interface.
18. The battery module of item 1, wherein a series configuration of the cells is between 24 and 29 cells connected in series.
19. A battery pack comprising at least one module as defined in item 1.
20. A battery pack thermal management system for a vehicle comprising at least one of the battery modules defined in item 1, and a battery controller with software algorithms configured to control the thermal management of the cells of the at least one battery module.
21. The system of item 20, wherein the system is configured to cool anodes of the cells independently of cathodes of the cells, and to cool cathodes of the cells independently of anodes of the cells.
22. A method of controlling the cell temperature of a battery module using the system of item 20, said method comprising the steps of:
predicting, using the software algorithms, the battery power necessary to operate or recharge the vehicle,
assigning, using the software algorithms, the right temperature profile to the cells to maximize efficiency and/or minimize resistance/impedance; and
modifying, using the software algorithms, the temperature of the cooling means of the battery module based on the results of the assignment step.
23. The method according to item 22, wherein the method further comprises the step of controlling, using the software algorithms, the power output and voltage sag of the battery module so as to decrease the internal resistance as much as possible.

DETAILED DESCRIPTION OF THE ILLUSTRATIVE EMBODIMENTS

Battery Module

Figure 1:
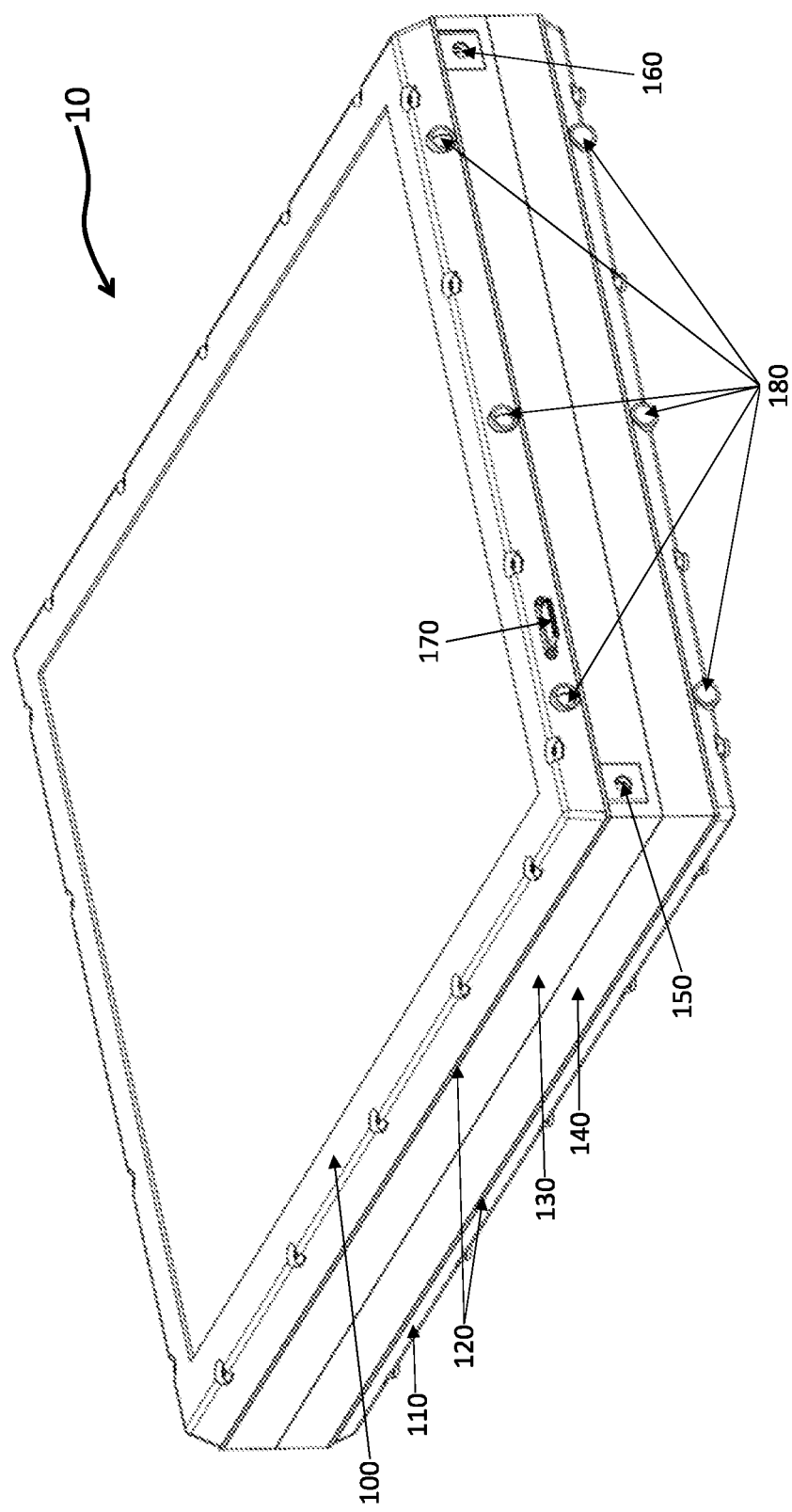
FIG. 1 is a perspective view of a battery module in accordance with an embodiment of the present invention.

In order to address the above and other drawbacks, there is provided a battery module comprising cells and partial immersion cooling means configured to be positioned directly around the electrode(s) of the cells of the battery module.

For clarity, the expression "directly around" means that the partial immersion cooling means are configured to be in direct contact with the electrodes of the cells of the battery module, such as by having the electrodes at least partially immersed in the partial immersion cooling means, preferably fully immersed.

In embodiments, each cooling layer can comprise a layer of sealing material, such as neoprene, to prevent the partial immersion cooling means from leaking, for example into cell-containing layers. The layer of sealing material comprises apertures that are dimensioned so as to sealingly receive the cells, in such a manner that the cells come into direct contact with the partial immersion cooling means without the partial immersion cooling means leaking out of the cooling layer. The layer of sealing material essentially functions as a sealing gasket to contain the partial immersion cooling means in the cooling layer.

In embodiments, the battery module further comprises: a polymer box/casing for housing the cells, said casing comprising one or more cooling layers, preferably at least two cooling layers, one at the top and the other at the bottom, that serve to contain the partial immersion cooling means, said casing also preferably comprising at least one holder (preferably comprised of a top holder and a bottom holder) to better secure the cells. The holder may comprise a top surface and/or a bottom surface each comprising apertures configured to receive the cells. In embodiments, multiple holders may be used. For example, a holder with larger dimensions can be placed around a holder of smaller dimensions so as to "encase" said smaller holder.

In preferred embodiments, the casing comprises a top casing defining one cooling layer and a bottom casing defining a second cooling layer.

In operation, the battery module will comprise partial immersion cooling means, preferably dielectric liquid, inside said cooling layers.

In embodiments, the battery module also further comprises a PCB-current collector; sensors; and other PCBs (MMU/BMU/BMS).

In embodiments, the battery module may further comprise: at least one partial immersion cooling means inlet port and/or outlet port for the cathodes of the cells; at least one partial immersion cooling means inlet port and/or outlet port for the anodes of the cells; and fittings. The battery module may also be configured to be operatively connected to a complete NC system/chiller—external to the battery module and battery pack comprising said battery module. For clarity, each port may function as an inlet or an outlet for the partial immersion cooling means.

In embodiments configured to recirculate the partial immersion cooling means, the battery module may comprise more than one cooling layer (such as two) and yet only comprise two ports (e.g. two cooling layers each comprising only a single port). In such embodiments, the cooling layers should be flowingly connected to each other in such a manner so as to allow for recirculation of the partial immersion cooling means, with at least one port functioning as an inlet and at least one port functioning as an outlet for all cooling layers of the battery module. However, in embodiments where each cooling layer comprises multiple ports, there is no need to flowingly connect the cooling layers together, as each cooling layer could have its own inlet and outlet port.

In preferred embodiments, the cells are electrically connected on one side, by means of laser welding, wire-bonding, or any other means known in the art, more preferably laser welding.

In embodiments, the partial immersion cooling means comprises a dielectric liquid that is configured to be thermally managed and recirculated around the cells of the battery module. This achieves better energy density compared to prior art systems that use cooling plates or ribbon, which take a relatively large amount of space as compared to a dielectric fluid.

While it is preferable that dielectric liquid is used as the partial immersion cooling means, other coolant liquids with high thermal conductivity (preferably 0.10-0.15 W/m*K) can be used, such as transformer oil or any liquids with a high dielectric strength, a relatively high thermal conductivity, and a stable density over the temperature range permitting recirculation, if needed.

In embodiments, the battery module permits a far greater energy and power density, as the cells can be stacked very close to each other and output a greater current, while being kept colder, thanks to the thermal properties of the module.

While discharging or recharging, a battery cell liberates some energy in the form of heat, by Ohmic losses (electrical) and Ionic losses (physical, chemical). The area of the cell the most prone to heating depends on the SOC (State of Charge), the chemistry used (NMC, NCA, LFP, LTO), discharging or recharging, placement of the tab on the cell, and additional factors. The problem is that the heating spot will be different between discharging or recharging (charging the battery or driving the vehicle) and dependent on SOC level. To sort this problem out, and provide additional cooling power, as previously mentioned, both the anode and the cathode of the cells are at least partially immersed in a partial immersion cooling means, preferably a dielectric liquid.

In embodiments, the battery module design implements a powerful cooling technique using a dielectric liquid as a thermal conductor directly on the cells and contained in one or two layers in the module casing.

The casing of the battery module is preferably constructed from a plastic that is either thermally insulant or thermally conductive, depending on the topology chosen, i.e. active cooling or passive cooling, respectively. The top and bottom of the cells (cathode and anode, which are the most prone to heat) are immersed in the dielectric liquid, but only up to a few millimetres in height, so the cooling happens axially only and does not contribute to the diminution of the capacity in each single cell. This at least partial immersion of both electrodes can be achieved using a casing with at least two cooling layers which contain the dielectric liquid into which the cells are partially immersed. In addition, in order to achieve the highest thermal transfer, the battery module may comprise micro cooling channels that go directly under or over the anode and cathode, respectively. Also, the dielectric fluid volume required, and thus the weight, is minimal, helping achieve a leading energy and power density.

Each micro channel can be less than 1 mm in width, but they can also be up to several millimeters in width. Preferably, each micro channel is at least about 500 microns, about 600 microns, about 700 microns, about 800 microns, or about 900 microns in width, and/or at most about 5 mm, about 4 mm, about 3 mm, or about 2 mm in width. In more preferred embodiments, each micro channel is about 1 mm in width.

In preferred embodiments, the cells of the battery module are directly in contact, partly immersed, in a dielectric fluid which fills two cooling layers, at the top and bottom of the battery module, and which has a high thermal conductivity (preferably 0.10-0.15 W/m*K). Conventional dielectric fluids include inter alia 3M Novec, Fluorinert, Solvay PFPE, Mivolt DFK, and Engineered fluids AC-140. In preferred embodiments, the battery modules are configured such that, when used in a battery pack system, the fluid is recirculated and actively cooled or heated, with an external complete A/C system (electric automotive standard component, e.g. Valeo, Mahle, GraysonTs, etc.) to attain a high thermal capacity. Each cell anode is preferably immersed in 3-6 mm of liquid whereas cathodes are preferably immersed in 10-15 mm. These heights can be chosen to limit as much as possible the radial contact of the internal cell layers with the liquid (for a cylindrical cell, where electrolyte, separator and electrodes are wound to form the cell). There is typically a larger space where there are no layers on the cathode side because of the current strips and the current interrupt device (CID), whereas the anode is mainly composed of a metal can, so around 8 mm of height is lost at the cathode, resulting in a volume loss.

To help with the overall design, in the case of cylindrical cells, they can be laser welded or wire bonded on one side only. On the same side, the current collectors (preferably conductive nickel-plated copper plates, strips, or PCB embedded current collectors) can be located above the cells. Current and voltage sensors can also be located at the top, but the temperature sensors can be placed in the middle of the cell to enable better monitoring, as well as on top.

In embodiments, the cells are arranged in a honeycomb design, for thermal homogeneity and space saving. The casing, which, as mentioned, can be made of an electrically insulated plastic polymer, is designed to accommodate the two cooling layers. The plastic polymer used also has a high ($\geq 1$ W/m*K) or low thermal conductivity, if a passive or active cooling topology is used, respectively, to ensure that the heat is transferred in the most efficient way. The fact that the cooling layers are incorporated in the external casing of the battery module can allow for sufficient coolant flow and a large contact area to get the best possible thermal exchange.

With the battery module of the present invention, the cells are heated and cooled axially, which is the most efficient method to thermally manage lithium battery cells, according to Rivian VP of Propulsion, Richard Farquhar. This claim is supported by numerous scientific articles, such as "A study into different cell-level cooling strategies for cylindrical lithium-ion cells in automotive applications", by D. Worwood et al. In this article, Prof. D. Worwood elaborates on the superior heat removal power efficiency and lack of cell capacity degradation of the cooling topology where both electrodes are in contact with a cooling plate, compared to the other topologies. When compared in the study, the heat transfer coefficient appears to be fifteen (15) times better for axial cooling (h=875 W.m-2.K-1) than for radial cooling (h=60 W.m-2.K-1). Similarly, the cell thermal resistance is four (4) times better (lower) for "double tab cooling" (R=1.09 K/W) than for radial cooling (R=4.44 K/W). With preferred embodiments of the battery module of the present invention, both electrodes are in fact directly immersed in a partial immersion cooling means, preferably a dielectric fluid, thus increasing the two advantages highlighted by Prof. D. Worwood.

This helps ensure that the layers of electrolytes and separators inside each cell are all at the same temperature, or at least minimize the internal temperature delta. Hence, the cell impedance is the same throughout the cell, helping achieve uniform current draw inside each cell, for all cells, thus keeping usable capacity at its maximum.

In embodiments, the dielectric cooling method used by the battery module of the present invention integrates new concepts compared to other conventional dielectric cooling methods, such as the ones patented by GM (U.S. Pat. No. 8,852,772), Faraday Future (U.S. Pat. Nos. 9,692,095, 9,692,096) or even the Ricardo i-cobalt project. For instance, both electrodes are immersed in partial immersion cooling means, preferably dielectric fluid, but not the entire cell. Moreover, the fluid goes over and around the anode and the cathode of each cell, preferably using micro cooling channels and cooling layers between the cell holders and the casing, at the top and at the bottom of the battery module. The fact that the cell is cooled via both poles in direct contact with the partial immersion cooling means, preferably dielectric fluid, makes the heat removal process very efficient. In addition, the fact that the cell is not in contact radially with the partial immersion cooling means helps reduce the temperature delta inside the cells, between all electrolytes and electrodes layers. Another concept introduced by the battery module of the present invention is that the module of the present invention can be filled with a gas (Helium) to help with thermal management of the cells. Yet another concept introduced by the battery module of the present invention is that it can include an external chiller (HVAC) and heater, at a charging station for example, which will thermally manage the recirculated partial immersion cooling means, preferably dielectric fluid.

The casing is preferably made of a highly engineered plastic polymer, such as PET, ABS, or other polycarbonates and polyamides, reinforced with glass or carbon fiber for example, permitting the use of micro cooling channels while maintaining a robust structural integrity. The battery module is capable of having a higher voltage and a bigger size than conventional modules.

In preferred embodiments, the battery module casing is configured to allow the dielectric fluid contained in the cooling layers (preferably two cooling layers) to circulate, such as by using inlet and outlet ports. The dielectric fluid serves as a coolant, except that it flows directly around the cells, touching their electrodes, and will go through pump(s), cooler(s) (full AC, or only a radiator, depending on the heat rejection/application), and heater(s).

In embodiments, the battery module center layer, located between the two cooling layers, is filled with helium instead of air, to improve heat rejection and temperature homogeneity throughout the entire module, as the thermal conductivity of helium is six hundred times better than air's (15 W/m*K vs 0.025 W/m*K). In addition to being non-flammable, non-toxic, and lighter than air, helium is a fire retardant, helping improve battery safety. In conjunction with the dielectric fluid, the risk of fire is greatly diminished compared to a conventional state-of-the-art OEM battery design.

In preferred embodiments, the dielectric liquid also flows over the cell connections; welding tabs or wire bonds; the current collector; the temperature, voltage and balance sensors; and the wires. There are multiple options for the current collector and BMS architecture, one of the main ones being having a current collector in the form of a conductive plate made generally of nickel-plated copper placed directly on top of the cells, and all the sensors, balancing wires, and the BMS installed elsewhere in the module. On the other hand, a more recent technique used by major battery makers is to place the BMS board directly on top of the cells, in place of the current collector, and use traces embedded on some power layers in the board to transport and conduct current. Voltage, current and other sensors, as well as balancing hardware (resistors, transistors) and ICs are embedded in the same board. This later topology allows for higher robustness and better longevity, given that there are fewer disturbances to the flow using an embedded current collector BMS board. However, the first technique mentioned is also fully suitable and may be advantageous in some cases. The latter technique, namely the use of a PCB-current collector, is preferable for the battery module of the present invention.

In embodiments, another design for vehicles requiring a large amount of energy (such as industrial vehicles, trucks, and buses) is to superpose two layers of cells in one module and merge their anode cooling layer, so that the module has three cooling layer paths instead of four (one for the first cathode layer at the bottom, one for both anode layers in the middle and one at the top for the second cathode layer). In this case, there is an insulated plate between the two layers of cell anodes to reduce as much as possible the risk of electrical connection between those two layers of cells, which could cause a safety issue. This technique saves some material and components over modules where none of the layers are "merged".

In embodiments, the above-described single middle cooling layer for two layers of anodes (or two layers of cathodes, alternatively), can also be used for a big module where a lot of parallel cells are used, instead of having two middle cooling layers. It is also possible to use this structure when a high series count is used, e.g. 24S, 28S. In that case, the single middle cooling layer will be between the facing anodes (or cathodes, alternatively) of those two series' halves of the module.

Similarly, for a vehicle that needs an even greater amount of energy, the module can be designed such that it comprises a bottom cooling layer but no top cooling layer; instead, the module has a conductive material and reduced thickness (fewer mechanical layers). With such a design, multiple modules can be superimposed on top of each other when used as part of a battery pack system, with each module (except the one on top of the "pile") only having a bottom cooling layer but no top cooling layer, as defined above. The last module on top would comprise both cooling layers, or add a cooling plate on top, so the top (e.g. cathode) layer of this module is thermally managed with the same efficiency and power as the other module below it. In such a design, the "bottom" cooling layer of one module would help cool the top of the module directly below it.

It is to be understood that when the more than one module is intended to be used in a battery pack, each battery module in the battery pack can be configured to be connected to the other modules and/or to a central system using an HV and LV electrical interface.

In embodiments, when a vehicle does not require a high heat rejection power, a solution is to put two layers of cells with anodes facing each other, so that the two layers of cells share the same cooling layer, as described above. This way one middle cooling layer is used per two layers of cells. This solution may be the preferred one in the case of large capacity battery systems, such as those over 200 Kwh, like the ones typically found on buses, trucks or some industrial vehicles. These vehicles often require such a large battery capacity that the power required from the complete battery translates to a low current demand for each cell. Hence, the power needed for cooling is smaller, and this "shared cooling layer" technique is very appropriate.

Keeping the whole thermal management hardware inside a single module is best for reliability; accordingly, a bigger module having two layers of cells is a preferable option.

Regarding battery module mechanical and electrical topology, it is generally known that increasing the number of cells in each module helps decrease module price relative to using more modules comprising fewer cells. In that sense, preferred embodiments of the present invention also aim to bring the best possible energy density and cost by using the highest number of cells in series while keeping a safe voltage for workers to wear minimal protection and still be able to work with the battery module.

In this safety approach, the UL norm specifies that the first protection equipment level is safe to use up to 120 Vdc, and IEC 60364 defines extra low-voltage (ELV) as 120 Vdc. In addition, the International Electrotechnical Commission and its national counterparts (IET, IEEE, VDE, etc.) define extra-low voltage (<50 Vac or <120 Vdc) circuits. This is in the context of building wiring and the safety of electrical apparatuses.

When it comes to designing the module and integrating the above safety notions into it, a max charged voltage of 120 Vdc can be obtained. If a 4.2V/cell max is chosen, this being a standard recharge voltage for a single lithium ion cell, the closest option is to use 28 cells in series, i.e. 28S (117.6Vdcmax<120 Vdc), with the nominal voltage at 715.4 Volts. Taking 4.15V/cell, 29 cells in series gives 120.35 Vdc, which could also be a good combination. Also, 24S (i.e. 24 cells in series) is an interesting configuration that may be employed, as max voltage is 100 Vdc, and four times 24S makes 96S which is the standard 400 Vdc for battery voltage of typical electric passenger vehicles. The standard for heavy-duty electric vehicles is between 600 Vdc and 800 Vdc.

Regarding costs, the modules should preferably house the maximum possible amount of energy, which can translate to number of cells in the case of a module made of standard format 21700 cylindrical cells.

In embodiments, the series configuration can be between 24 and 29 cells connected in series as stated earlier. For the parallel connections, different ways can be envisioned depending on the application in which the battery will be used. For example, for a passenger vehicle application, such as a mid-sized automobile, the battery pack could house 60 Kwh, whereas in a truck or bus application, each battery pack could house between 150 Kwh and 250 Kwh, for a total battery capacity of up to 1 Mwh for example.

For example, a 42P28S module configuration using a standard format 21700, 5 Ah and 3.65V nominal lithium ion cell will give 21.5 Kwh per module, translating to 64.5 Kwh for a 84S (3 modules) battery pack and 150.5 Kwh for a 196S (7 modules) pack.

Similarly, a 42P29S module configuration with the same cell will give 22.23 Kwh per module, 66.7 Kwh for a 87S (3 modules) pack and 155.6 Kwh for a 203S (7 modules) pack, or 133.4 Kwh for a 174S (6 modules) pack. A 42P24S module configuration with the same cell will give 18.4 Kwh per module, 73.6 Kwh for a 96S (4 modules) pack and 147.2 Kwh for a 192S (8 modules) pack.

In the case of a module configured for passive cooling, it is not recommended to superpose but to keep only one layer of cells inside each module, to let the air flow free of obstacles.

In preferred embodiments, the battery module is configured for use with or without circulation of the dielectric fluid. In some lighter or less critical applications, like eBikes, eMotorcycles, some electric cars, for example for static energy storage, it is enough to use the module without recirculating the dielectric fluid, hence using passive air cooling in conjunction with the fluid.

In embodiments, the top and bottom cover can be designed for external thermal management (Fluid needs to be recirculated, at least circulated through a radiator (passive cooling) or through a complete active thermal management system (active cooling comprising heater and AC)) with coolant ports and composed of a thermally insulated material. Conversely, the top and bottom cover can be designed such that they are completely closed, without any external connections (meaning no inlets or outlets), and are made of a thermally conductive material.

In embodiments, the design for the module without active cooling can be configured to integrate an optional heating plate inside the box, to be able to heat the cells during colder weather/temperatures. In such embodiments, the top and bottom of the casing are preferably made of a very thermally conductive material, as opposed to the insulating material used in the active cooling design. In this way, the cells are thermally managed effectively, even without active cooling. Only in the hottest climates could this technique reduce battery life; however, it is likely to be suitable for temperate or cold climates.

In embodiments, the proposed design for the battery module in conjunction with the innovative thermal management approach used in the battery pack thermal control system defined below aims at increasing the stored energy (higher range) and available power (higher current charge/discharge) compared to conventional OEM standard battery module designs of equivalent volume and weight.

In embodiments, the battery module of the present invention also augments safety and battery life, and diminishes power and capacity degradation. In addition, it can help deliver more stable/higher performance during each and every usage for the whole life (no overheating, very low cell unbalance, less sag, etc.). Higher discharge and recharge power generally mean better performance and reduced charging times.

Considering recyclability, the module construction and material used are preferably selected to allow for a simple disassembly when the battery reaches end of life. For example, the cells can be extracted easily if they are not glued nor potted in any way, and not in contact with any thermal paste. That is another advantage of embodiments of the battery module of the present invention compared to conventional OEM battery designs that typically use the aforementioned paste and glue, which makes the extraction and recycling of the battery pack materials difficult.

In embodiments, the battery module can have different configurations and designs to achieve direct contact between the partial immersion cooling means and electrodes of the cells. A few of the possible solutions are presented in the drawings discussed below. Specifically, FIGS. 1 to 14B show different battery model configurations according to different embodiments of the present invention.

Referring to FIG. 1, there is shown an example of a fully assembled battery module 10 of the present invention, with a 18P28S configuration. The top casing 100, and bottom casing 110, as well as the top holder 130 and bottom holder 140 form most of the mechanical structure encasing the cells. The non-leakage of the cooling fluid (the partial immersion cooling means) comprised in the top and bottom layers of the module is ensured using sealing gaskets 120 (which in this case is a layer of sealing material, such as neoprene, comprising apertures that are dimensioned so as to sealingly receive electrodes of the cells, in such a manner that the cells come into direct contact with the partial immersion cooling means without the partial immersion cooling means leaking out of the cooling layer), although other sealing means can be used. Regarding electrical interfaces, the negative and positive poles 150 160 make the high voltage power contacts, and the communication/low voltage connection is provided by the connector 170. Cooling holes 180, or cooling ports, are used as inlets and outlets for the partial immersion cooling means. This particular configuration is configured to use a counter-flow topology to maximise the thermal efficiency. The module shows six ports per face, twelve in total, but there can be a very large number of ports, starting from two, one inlet and one outlet, for the whole module, as explained above.

Figure 2:
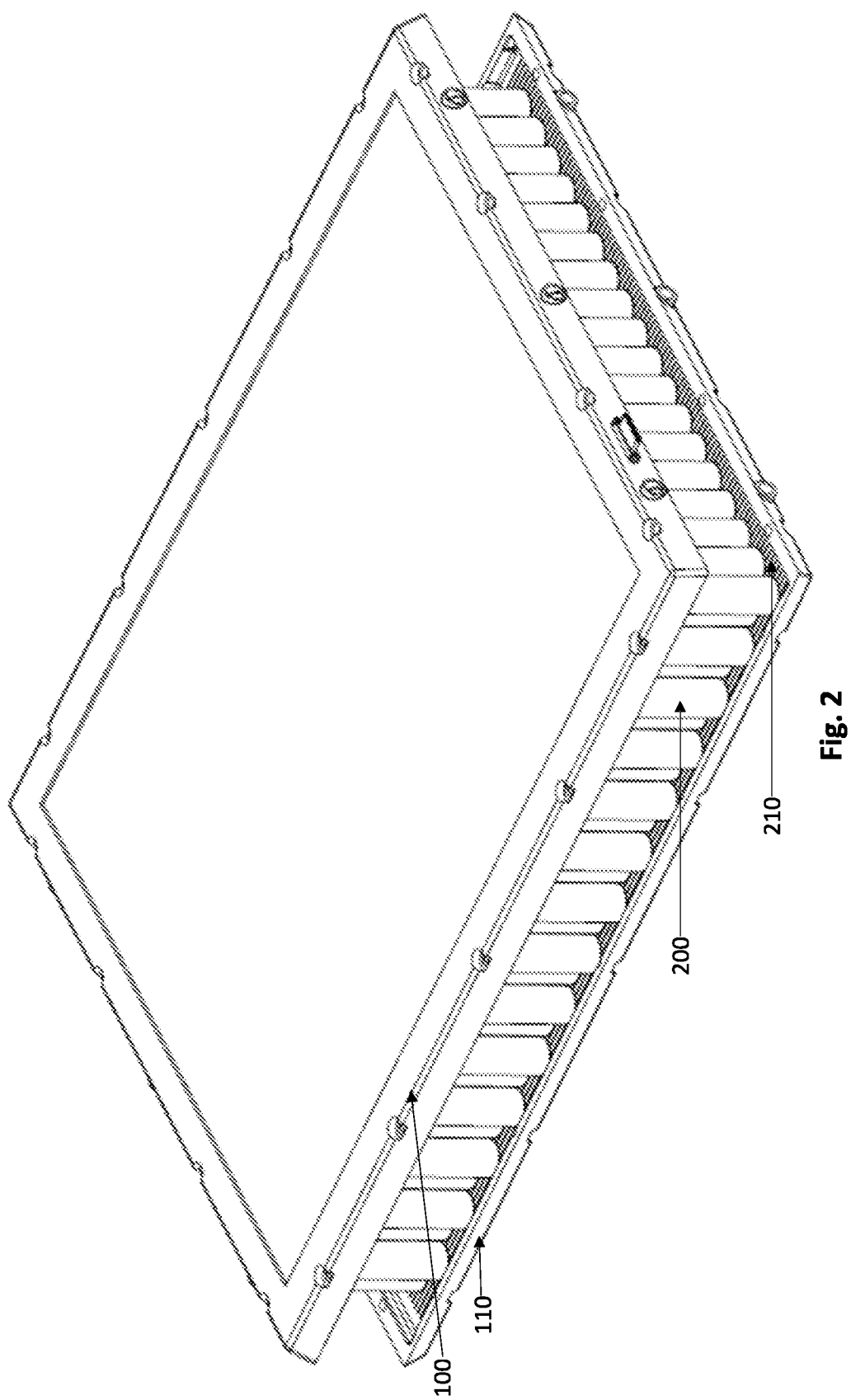
FIG. 2 is a perspective view of the battery module of FIG. 1 without cell holders, in accordance with an illustrative embodiment of the present invention.

Referring to FIG. 2, there is shown the battery module of FIG. 1 without the cell holders, showing the top surface of the bottom casing. There is shown the battery cells 200, that are partially immersed in the cooling fluid contained in cooling layer 210 of the bottom casing. The cooling layer 210 comprises multiple micro channels, which permit the fluid to go under each cell's anode, in addition to going around it, to enable a better cooling performance.

Figure 3:
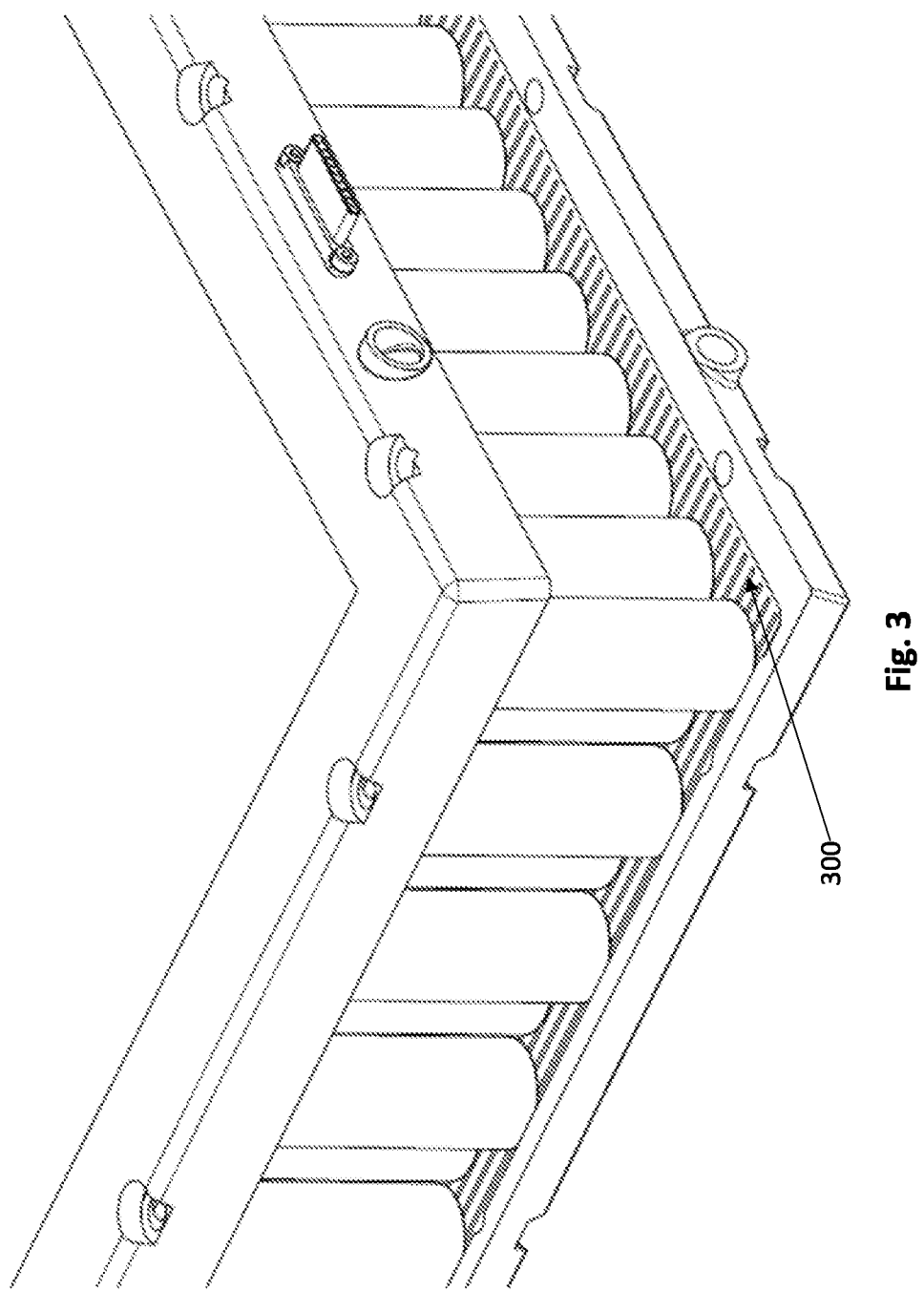
FIG. 3 is a close-up of a portion of FIG. 2.

Referring to FIG. 3, there is shown a close-up of a portion of FIG. 2. This view shows a higher level of detail of the cooling layer 210 that contains multiple micro channels 300, as previously described.

Figure 4:
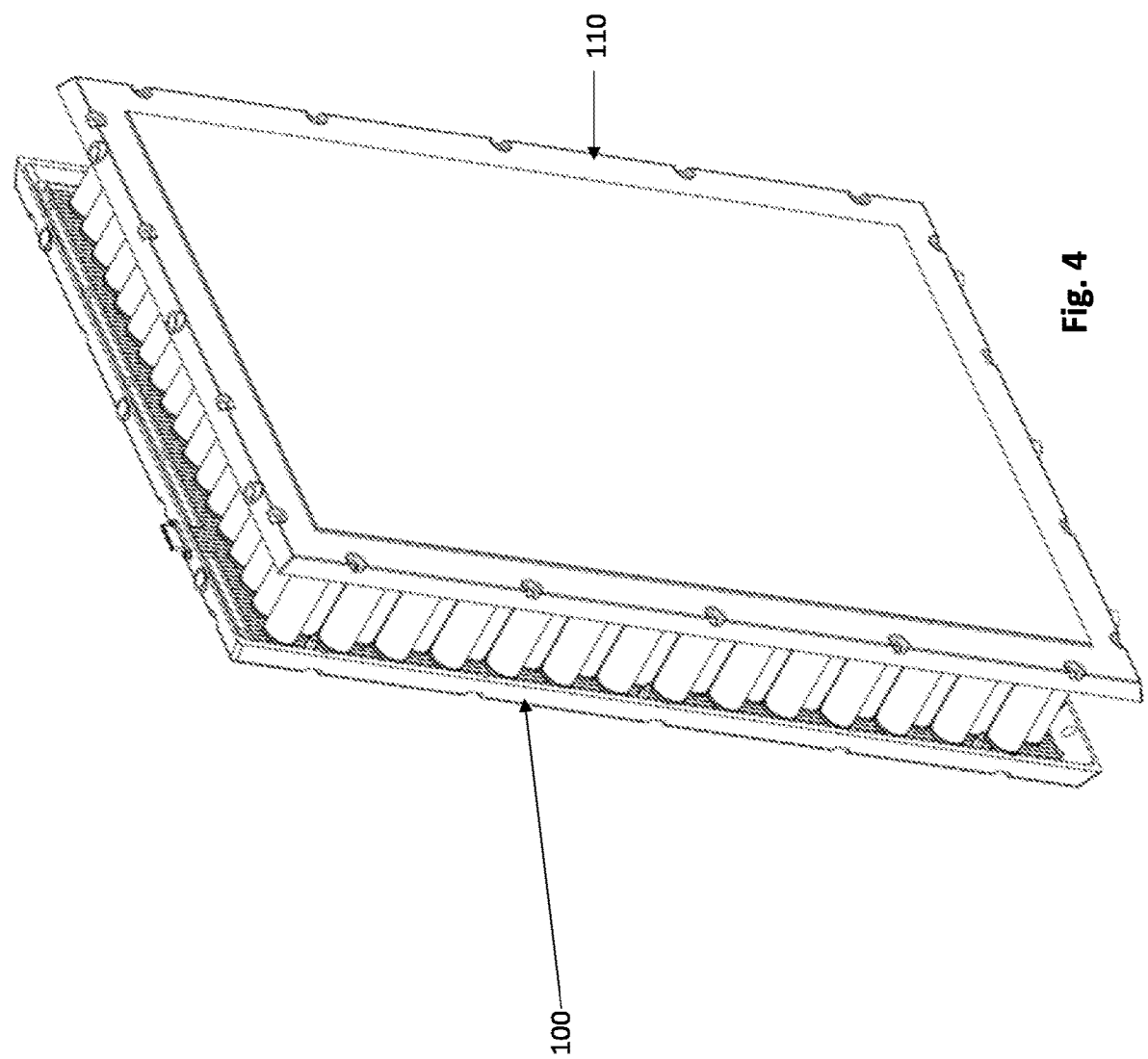
FIG. 4 is a different perspective view of the battery module shown in Figure

Referring to FIG. 4, there is shown a different perspective view of the battery module shown in FIG. 2 (i.e. with the cell holders having been removed), showing the bottom surface of the top casing, in accordance with an illustrative embodiment of the present invention.

Figure 5:
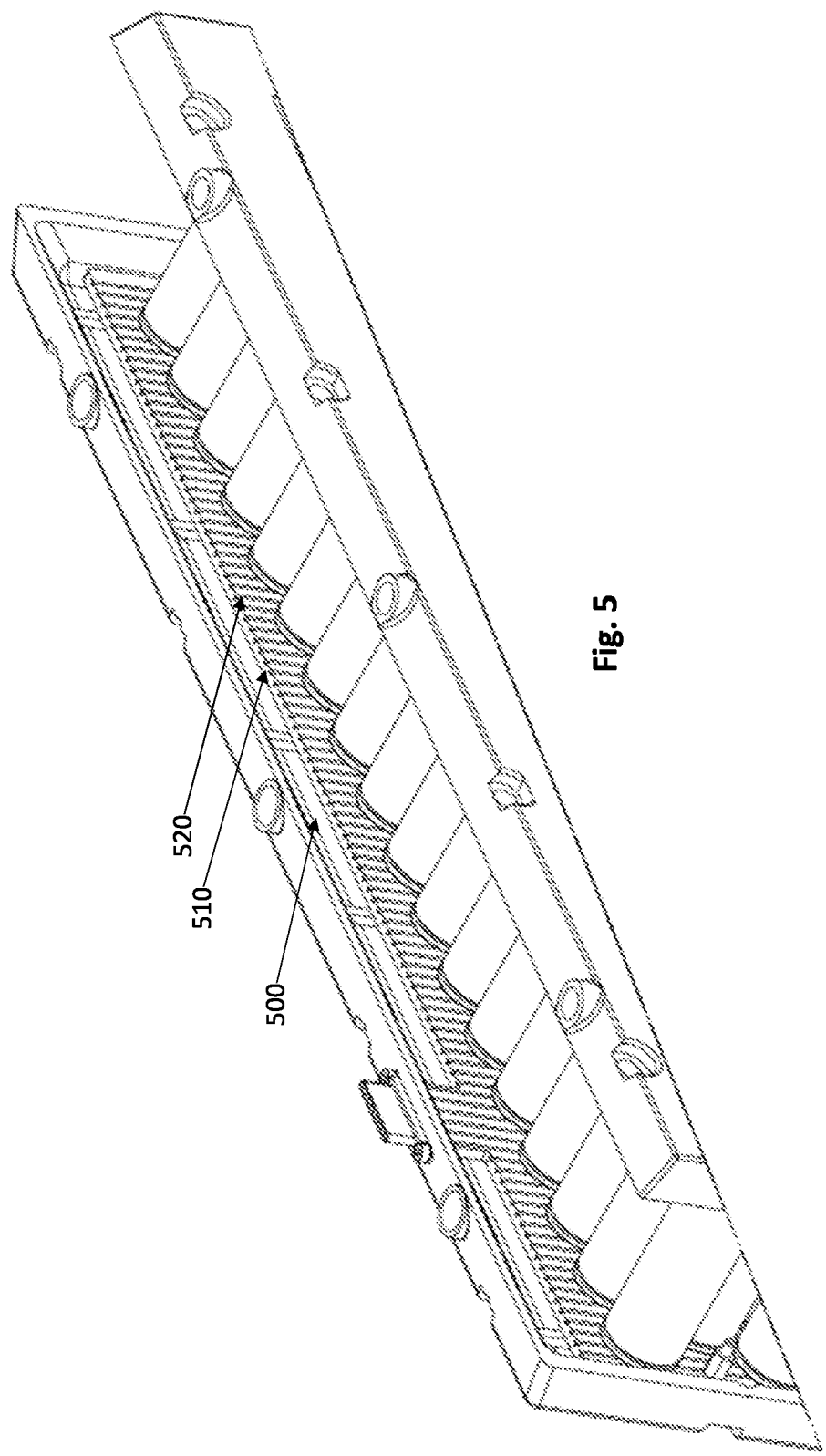
FIG. 5 is a close-up of a portion of FIG. 4.

Referring to FIG. 5, there is shown a close-up of a portion of FIG. 4, showing the bottom surface of the top casing in more detail. This battery module is configured such that fluid flows between the top plate 500 and the top surface of the PCB-current collector 510, as well as in between the micro channels 520 at the bottom of the PCB-current collector and the top of the cell holder, similar to the bottom casing micro channels, in order to achieve better cooling efficiency and overall performance.

Figure 6:
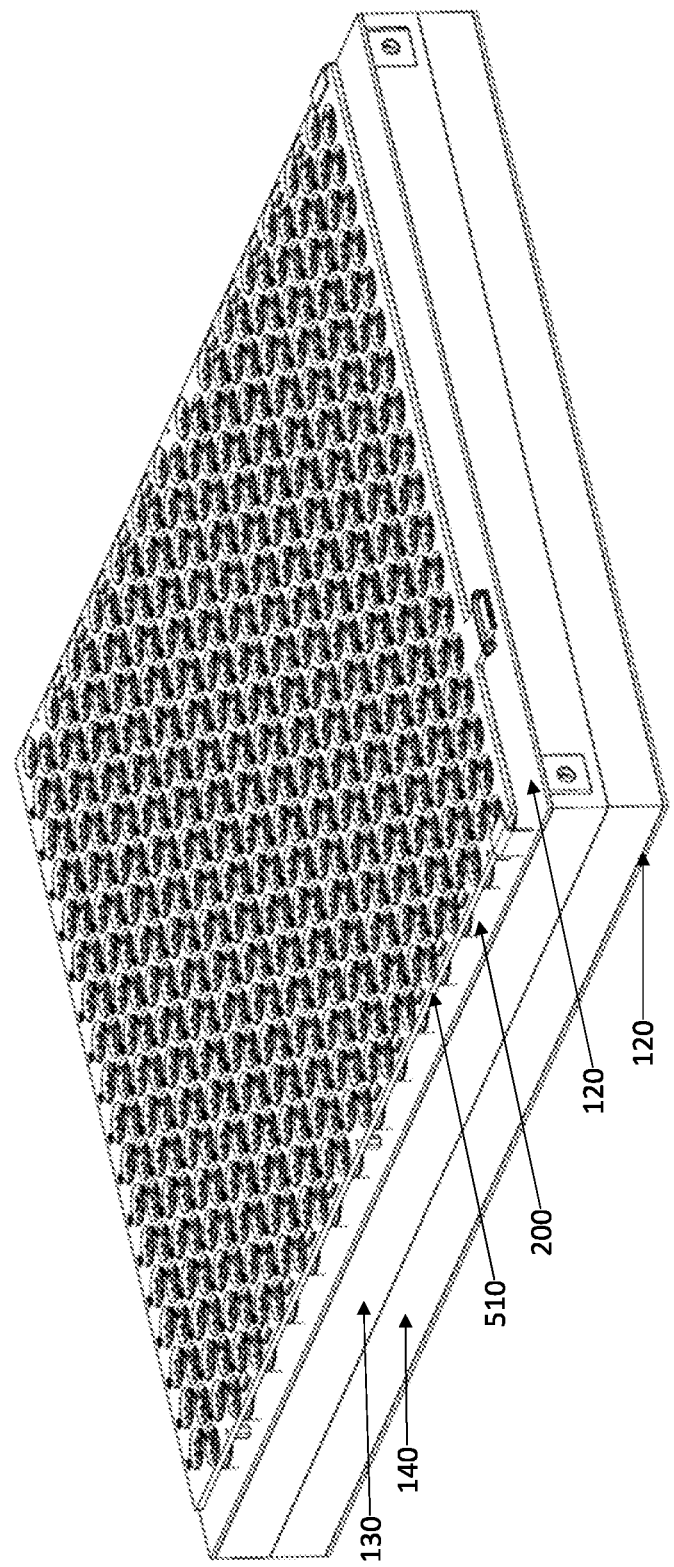
FIG. 6 is a perspective view of the battery module of FIG. 1 without casing.

Referring to FIG. 6, there is shown a perspective view of the battery module of FIG. 1 without the top and bottom casing, thereby better showing the holders and PCB-current collector. The bottom holder 140 and top holder 130 are configured to host the cooling fluid in conjunction with the components previously described. The cells, such as cell 200, are electrically connected with the PCB-current collector 510, by way of ultrasonic welding, wire bonding, laser welding, or other techniques.

Figure 7:
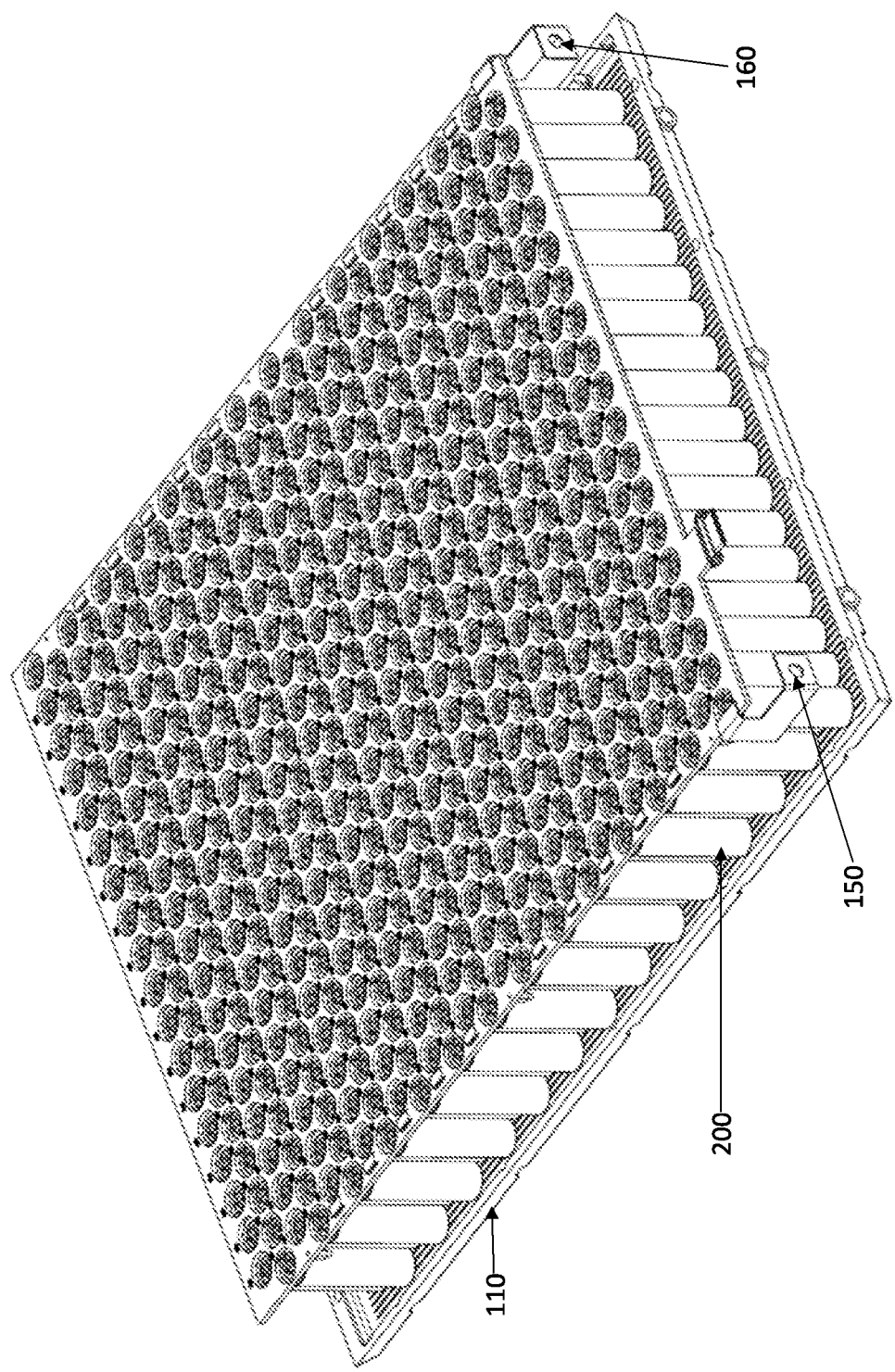
FIG. 7 is a perspective view of the battery module of FIG. 1 without the top casing and cell holders.

Referring to FIG. 7, there is shown a perspective view of the battery module of FIG. 1 without the top casing and cell holders, thereby better showing the bottom casing, PCB-current collector, and electrical poles. Both electrical poles 150 160 are shown in more detail.

Figure 8:
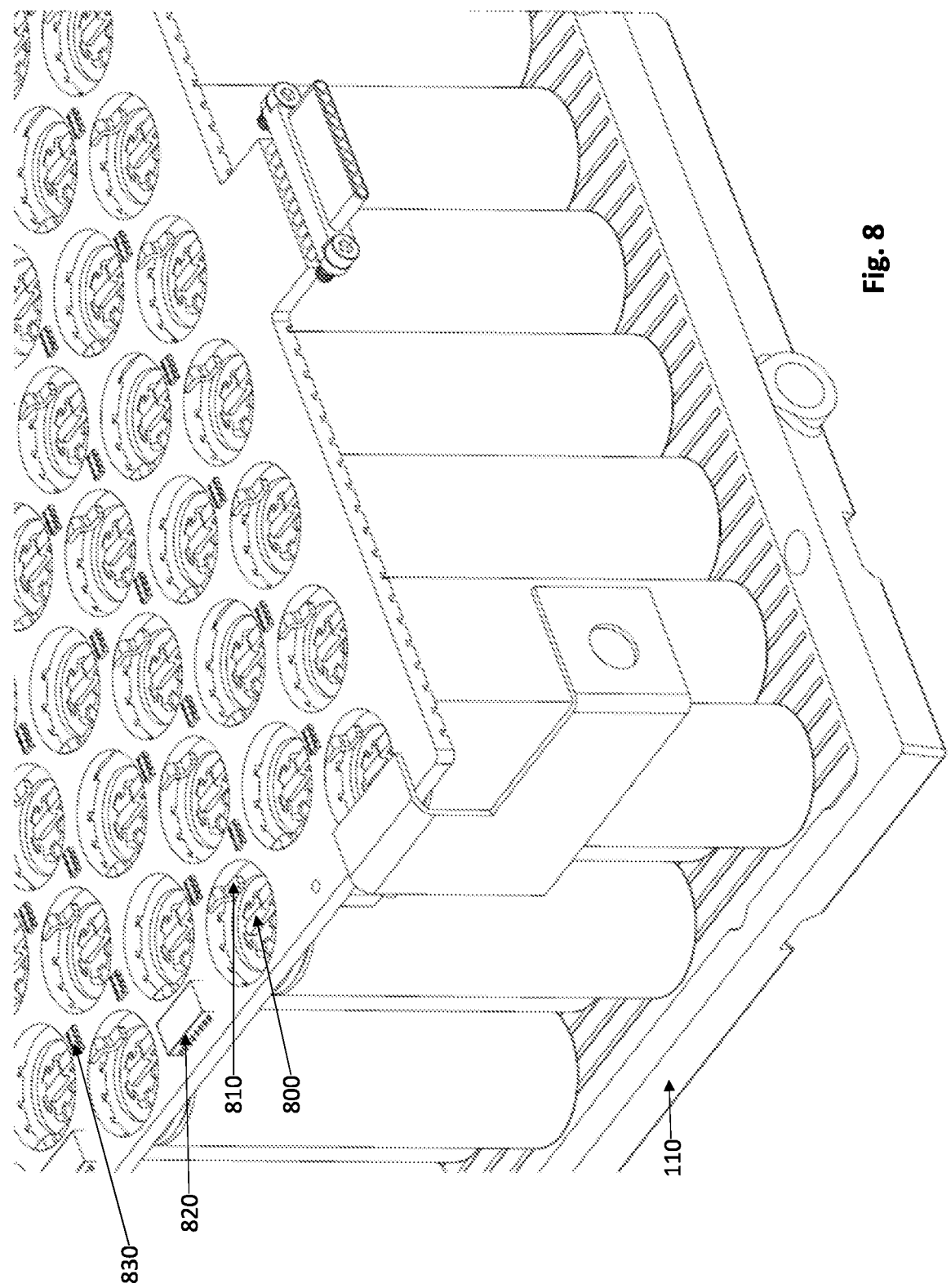
FIG. 8 is a close-up of a portion of FIG. 7.

Referring to FIG. 8, there is shown a close-up of a portion of FIG. 7. In this example, a conductive material such as copper, aluminum, nickel, or a combination thereof is used to make the tabs that electrically connect the cells to the PCB-current collector, using laser welding, wire bonding, or other techniques known in the art. The positive tab 800 connects the cathode of the cell and negative tab 810 connects the anode. There is also shown an integrated circuit (IC) 820, and a resistor 830, that are both part of the B/MMU—Battery/Module management unit.

Figure 9:
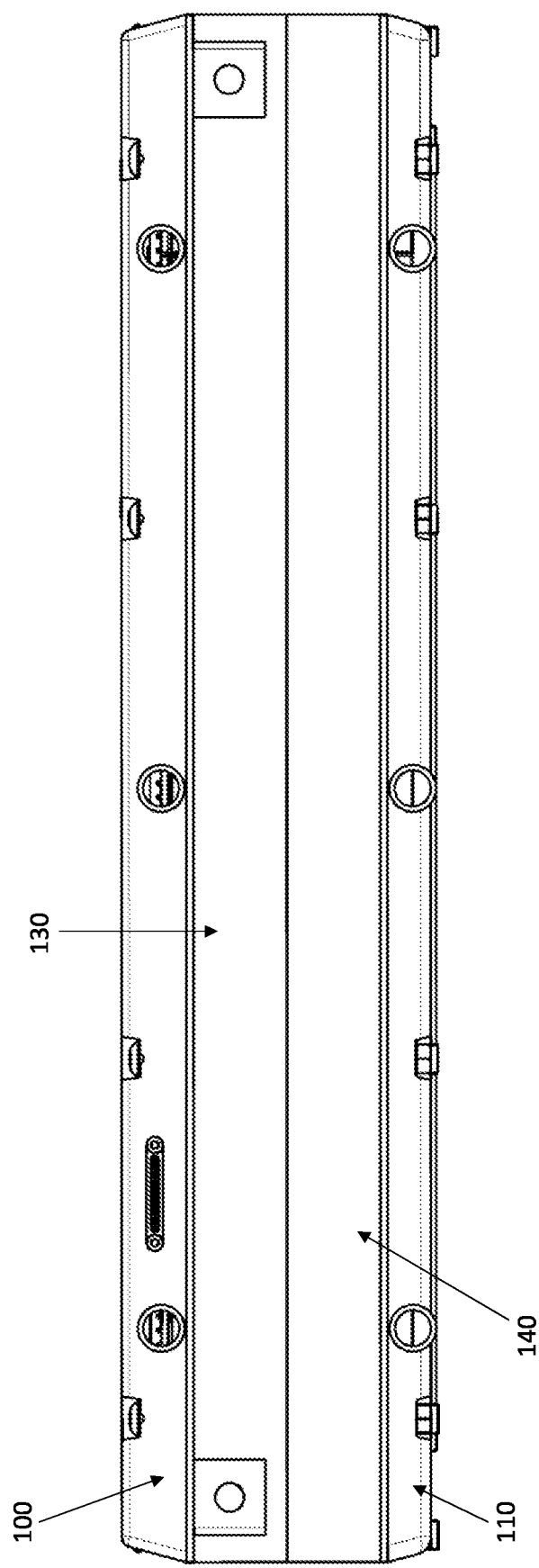
FIG. 9 is a front view of the battery module of FIG. 1.

Referring to FIG. 9, there is shown a front view of the battery module of FIG. 1.

Figure 10:
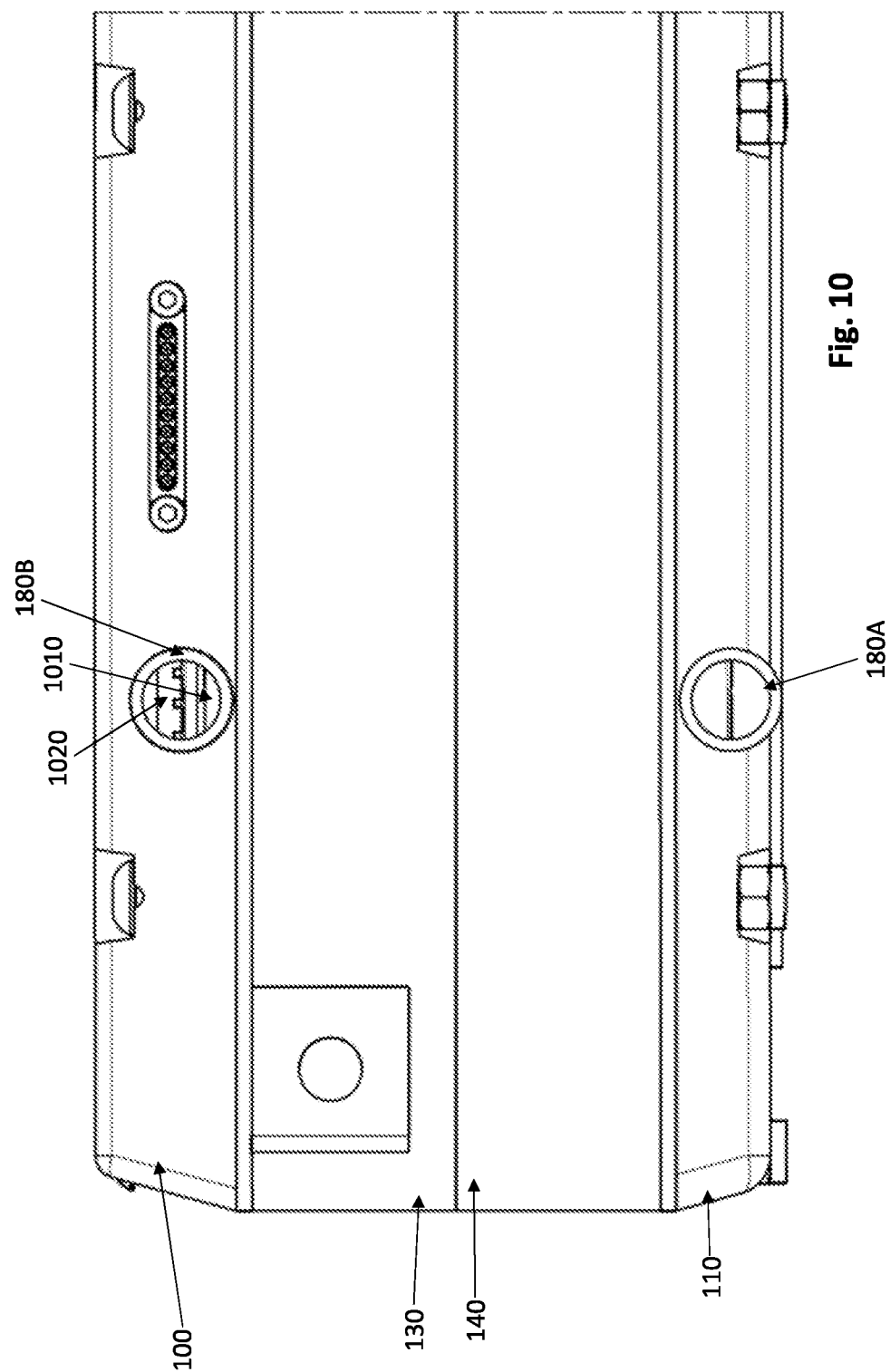
FIG. 10 is a close-up of a portion of FIG. 9.

Referring to FIG. 10, there is shown a close-up of a portion of FIG. 9. The bottom cooling port 180A is configured to guide the liquid under the cells, in the micro channels of the bottom casing, and around the anode, between the bottom casing and the cell holder. The top cooling port 180B is configured to guide the liquid into two places; as previously discussed, it allows the fluid to go on top of 1020 and at the same time under 1010 the PCB-current collector, to allow for the largest cooling surface of the cell axially, and around the cathode, respectively.

Figure 11:
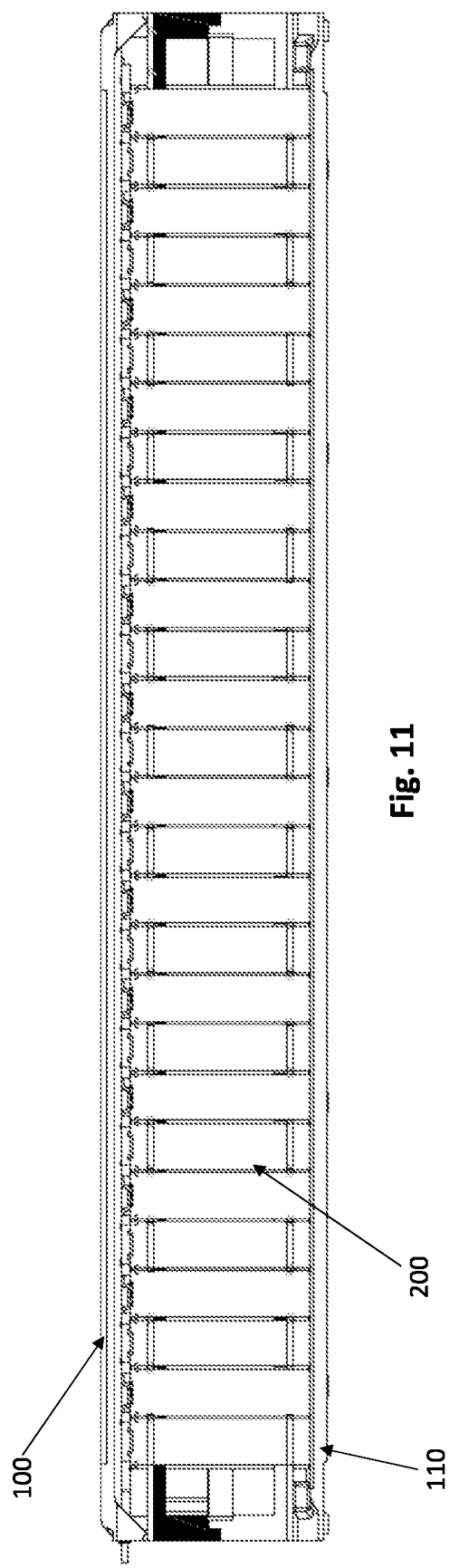
FIG. 11 is a side cross-sectional view of the battery module of FIG. 1.

Referring to FIG. 11, there is shown a side cross-sectional view of the battery module of FIG. 1.

Figure 12:
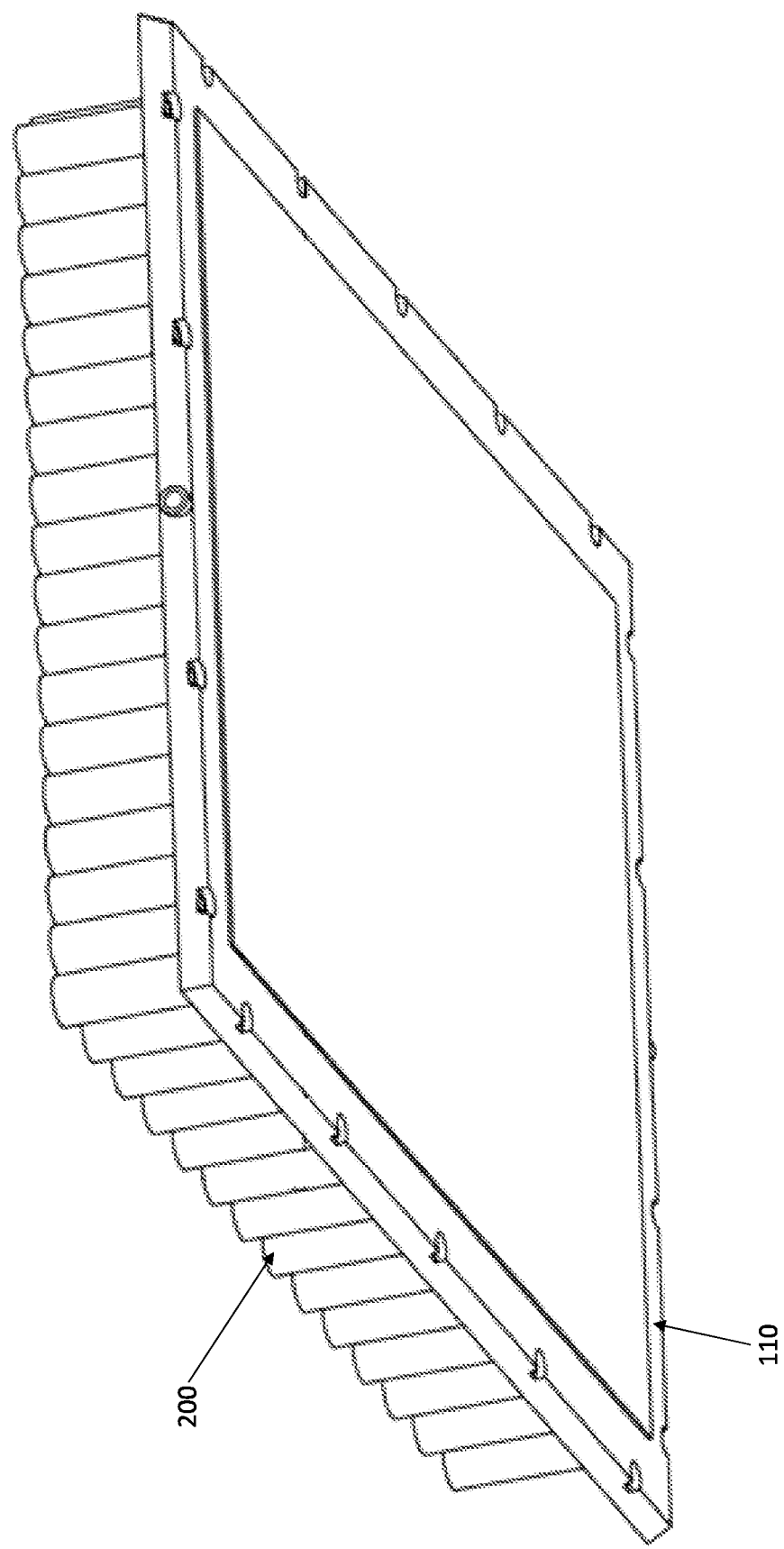
FIG. 12 is a perspective view of the cells and bottom casing of a battery module, in accordance with another embodiment of the present invention.

Referring to FIG. 12 there is shown a perspective view of the cells and bottom casing of a battery module, where the bottom casing comprises only one (1) cooling hole, in accordance with another embodiment of the present invention. This represents one of the multiple options available in the design of the battery module to achieve similar results.

Figure 13A:
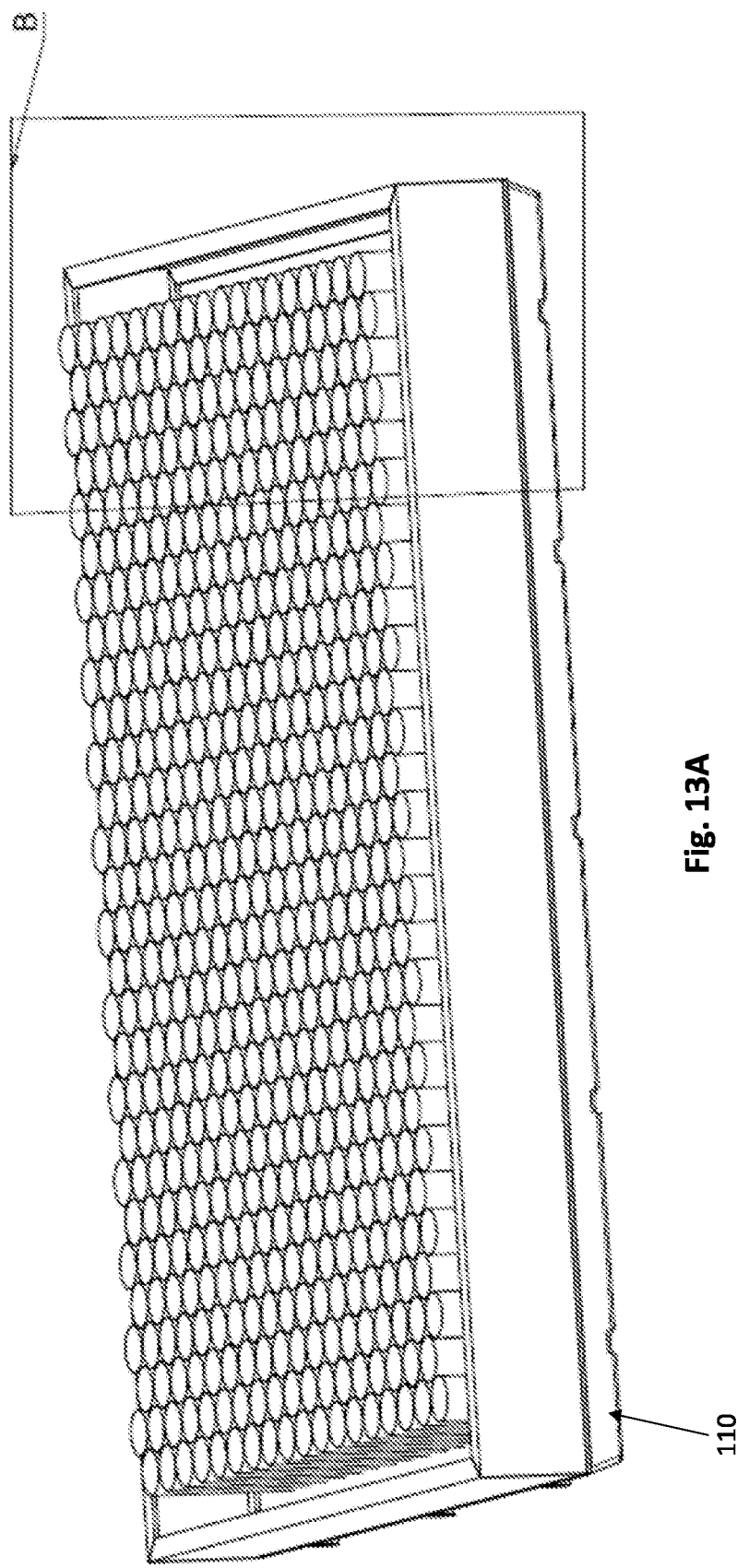
FIG. 13A is a perspective view of the cells, bottom plate and cell holder of a battery module in accordance with yet another embodiment of the present invention.

Referring to FIG. 13A, there is shown the cells, bottom plate and cell holder of a battery module in accordance with yet another embodiment of the present invention. It is a different design for the holders and cooling layers, showing another design alternative achieving the same partial immersion cooling.

Figure 13B:
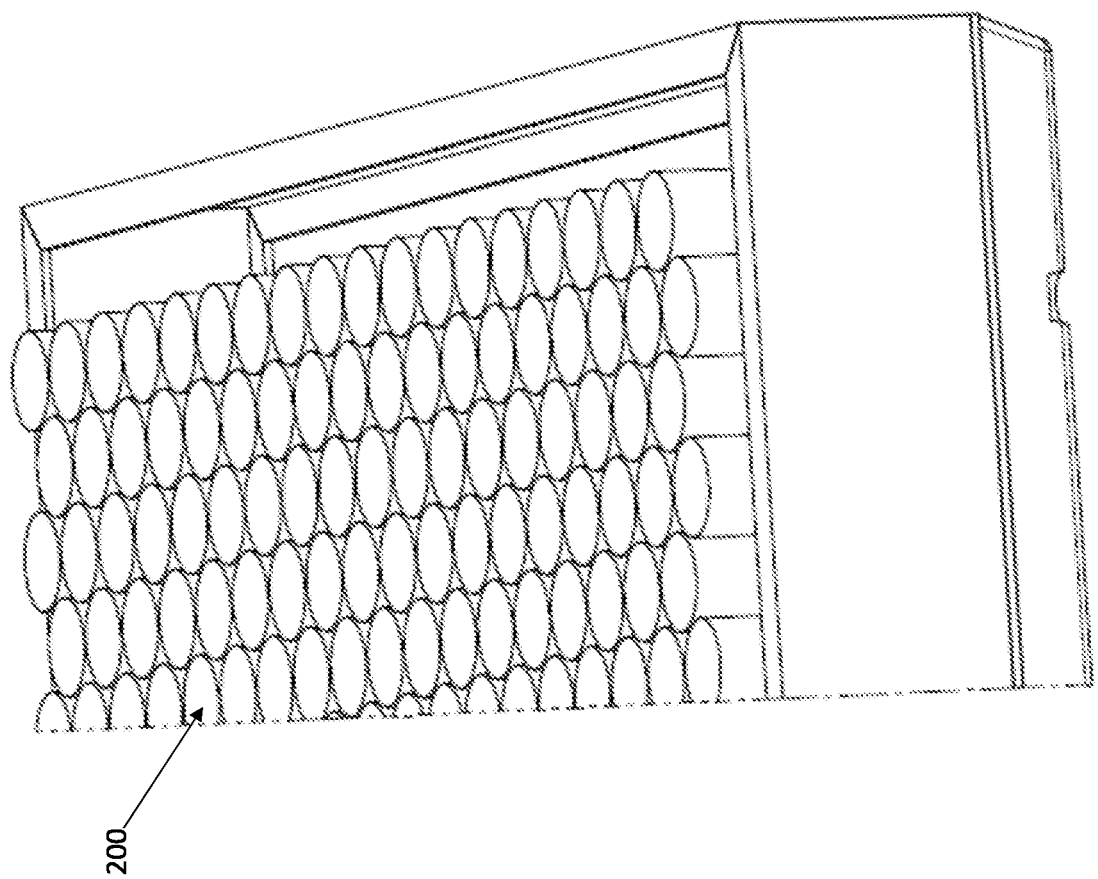
FIG. 13B is a close-up of a portion of FIG. 13A.

Referring to FIG. 13B, there is shown a close-up of a portion of FIG. 13A.

Figure 14A:
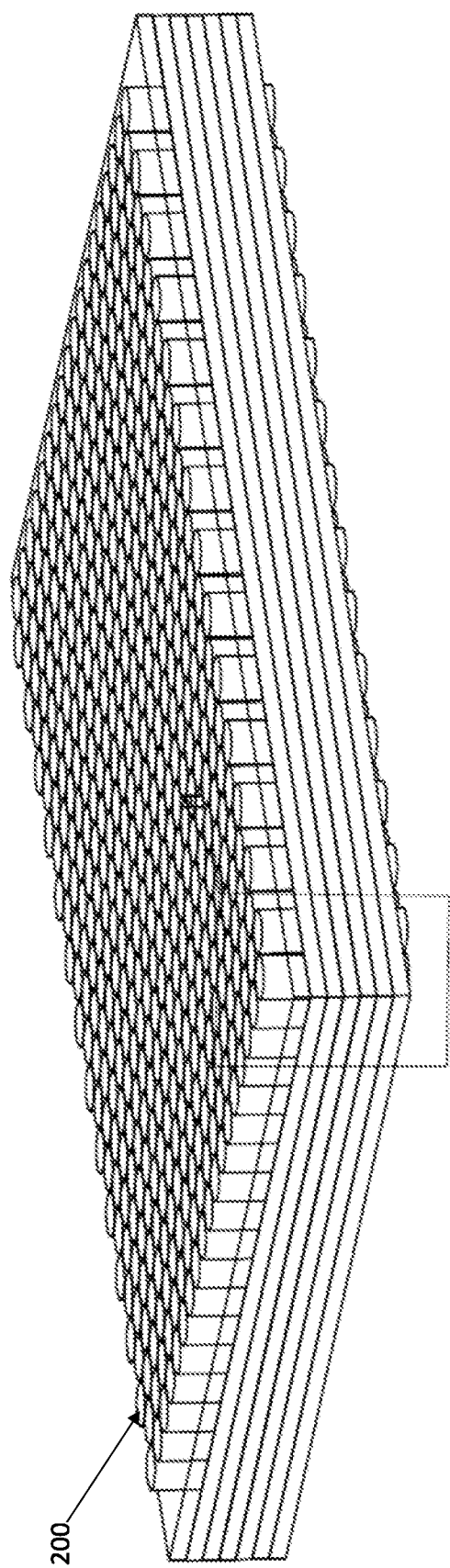
FIG. 14A is a perspective view of the cells and cell holder of a battery module in accordance with yet another embodiment of the present invention.

Referring to FIG. 14A, there is shown the cells, bottom plate and cell holder of a battery module in accordance with yet another embodiment of the present invention. It shows a different design for the holders, comprised of multiple layers of a type of foam having special mechanical and thermal characteristics, such as expanded polypropylene, EPP.

Figure 14B:
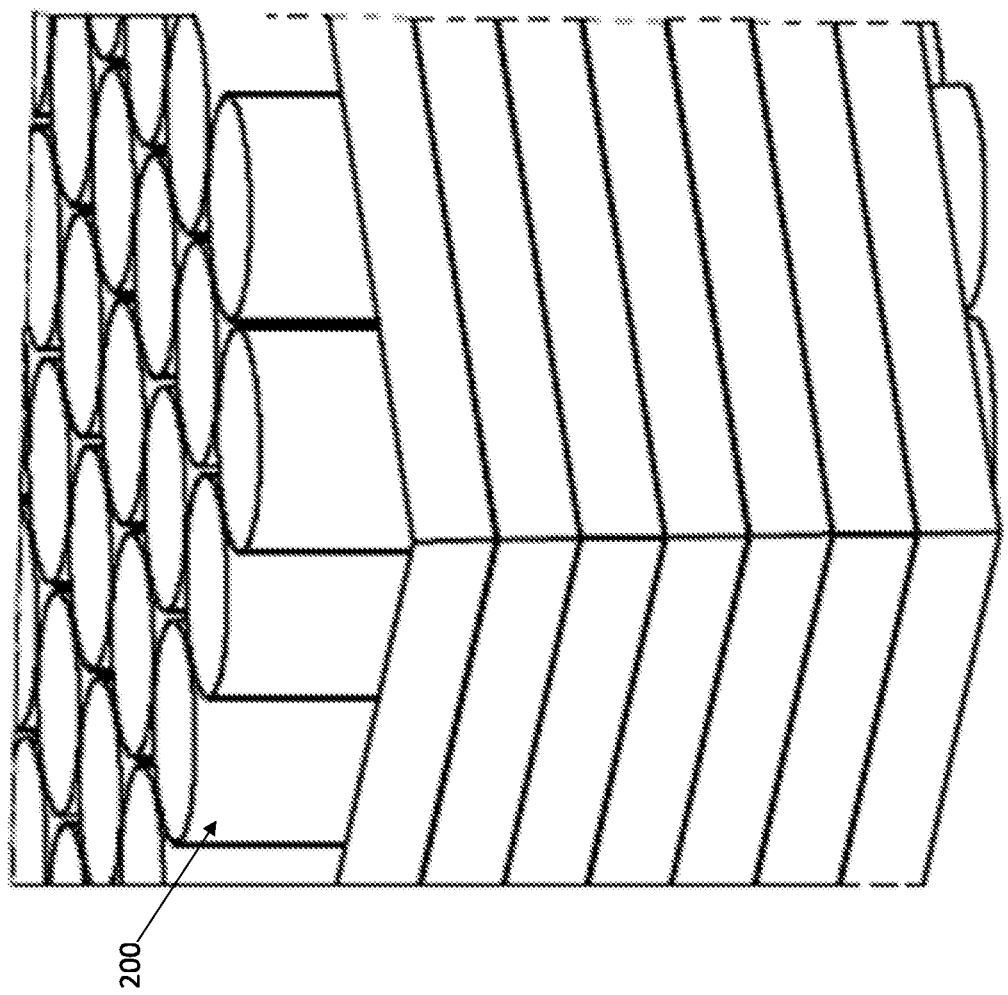
FIG. 14B is a close-up of a portion of FIG. 14A.

Referring to FIG. 14B, there is shown a close-up of a portion of FIG. 14A.

Battery Pack Thermal Control System

In a second aspect of the present invention, a battery pack thermal control system is provided. Said system comprises at least one of, preferably a plurality of, the modules defined in the previous section.

Said thermal control system comprises a battery controller with software functions to control the thermal management, preferably using intelligent load prediction, pre-heating & thermal conditioning, and dynamic charging control.

Also, using the battery pack thermal control system of the present invention, a method of controlling the cell temperature is provided: first, the software functions are able to predict the battery power necessary to operate or recharge the vehicle, after which it can assign the right temperature profile to maximize efficiency (minimize resistance/impedance).

The charging control software function also allows for improvements over the prior art, because charging power can be modulated based on a large set of parameters, but preferably temperature gradient increase, power dissipated, and cell resistance, so as to know where on the curve the charging power is, and to know when and how to modulate the charging power.

Concepts introduced by the battery pack thermal control system of the present invention are software related techniques: one is a technique used to precondition the battery to a certain temperature and state before a high power recharge or discharge, which is described later on, and the other one is an innovative way to manage the charging session by controlling the power output of the charger in accordance with various temperature deltas and gradients, estimated internal resistance, and other variables, to be able to maximize power and minimize charging time.

In embodiments, to be able to cool the cell in a powerful and efficient manner, the anode bath or the cathode bath can be controlled independently, permitting a temperature control of each electrode separately. This enables precise thermal managing of the heating area at the source, depending on the set of conditions, which would be parametrized in the software based on the physical cells used, as well as real-time measurements and conditions.

In embodiments, a charging control strategy is based on high fidelity models of the cells, battery module, complete battery pack, sensor feedback loops, and Proportional-Integral-Derivatives (PIDs), and not only on a global system thermal model and feedback loop, which is a common conventional practice. This allows the system to act quickly and control the temperature much more precisely, based on real-time current, SOC, and resistance/impedance estimation feeding these high-fidelity models as opposed to reacting (to an increase in temperature, for example, with a conventional thermal model).

To be able to get the battery cells to the optimal temperature at the moment needed (depending on the situation and the use), the loads applied to the battery need to be predicted.

In embodiments, with charging, the system first determines if a driver is going toward a charging station and which type of charging station (power requirement) based on factors such as vehicle schedule, GPS data, cameras, driver habits (ITS, machine learning), vehicle data (direction, speed), and battery data (SOC). Then, the system thermally prepares the battery (pre-heats or pre-cools) as well as controls the power output and voltage sag of the battery to help decrease the internal resistance as much as possible based on actual states, prior to the charging session.

In embodiments, during the charging session, the system controls the charging rate (current input to the battery) and thermal management power (cooling power) in a fast closed control loop that is designed to estimate precisely the internal resistance of the battery, based on a temperature delta and gradient, as well as cell/module/pack electrochemical and thermal models. In this way, the system can react quickly and alternate between recovery mode (low power charging or stop charging in order to let the battery cool down and recover its low internal resistance in a few seconds) and fast charging mode (high power charging), thus maximizing charging power and minimizing charging time.

In addition, based on a publication by Stanford Energy (Closed-loop optimization of fast-charging protocols for batteries with machine learning, published on Feb. 19, 2020), the battery is at its best state to receive high current recharge when the SOC is around 50%. In practice, that will lead to different acceptable current rates for different SOC ranges, with the highest between 30% and 70%.

These two software functions (pre-conditioning and charging control) of the battery are described in the enclosed flowchart (see FIG. 1) using a high-level view.

The flowchart shows three functions: 1. Intelligent dynamic load prediction used for thermal pre-conditioning; 2. Pre-conditioning/thermal management; control of the dielectric coolant layer(s) used to put the battery in the best conditions possible for fast charge/discharge; 3. Thermal & Impedance based charging control used for fast charging and prolonging life of the battery.

Figure 15:
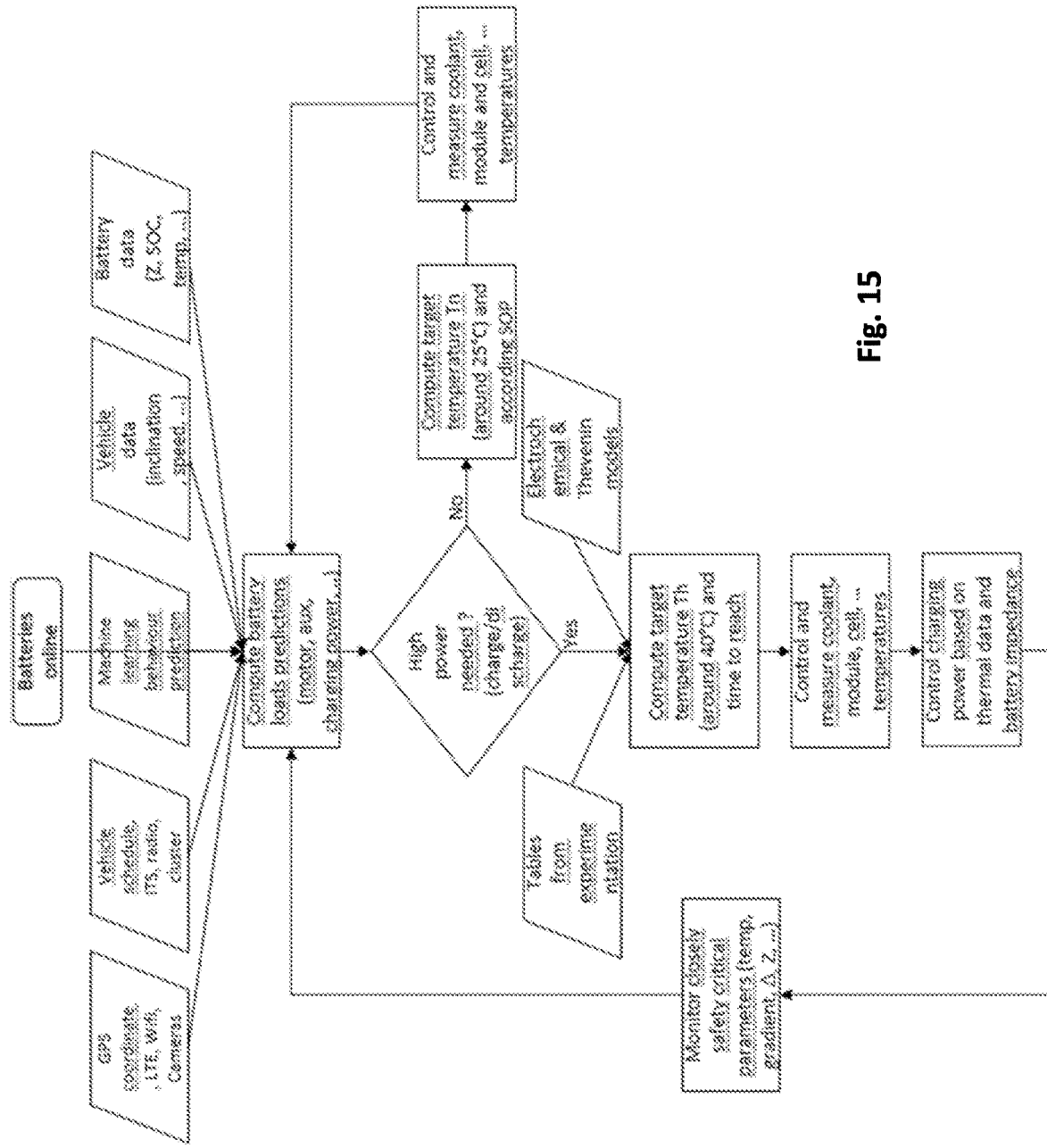
FIG. 15 is a flowchart of a battery pack temperature management system in accordance with an embodiment of the present invention.

Referring to FIG. 15, there is shown a flowchart of a process for temperature and charging control, in accordance with an illustrative embodiment of the present invention, using an embodiment of a system of the present invention. From the moment that the batteries are connected to a traction link (High voltage bus, battery contactors closed), the flow can start. The battery is connected to an electronic control unit (ECU) that receives inputs such as: GPS coordinates (online via LTE, Wifi, cameras) used to determine where the vehicle is and where it is going; vehicle schedule, ITS, radio cluster in the case of an agency truck or bus with a known schedule, a pop-up message prompting/asking the driver if he wants to recharge at a nearby station, drive slower, etc.; and Machine learning behaviour prediction, which can include a machine learning algorithm (AI) used to predict driver behaviour, e.g. charging every day, charging only when battery is empty, accelerating hard, etc. The more time the system is used, the more precise becomes the machine learning algorithm. Other inputs received by the ECU include Vehicle data (inclination, speed, acceleration, motoring power, regen power, etc.); and Battery data (Z, SOC, temp, etc.), including Impedance estimation techniques (Electrochemical Impedance Spectroscopy EIS coupled with precise models), SOC, coolant temperature, cell temperature, temperature gradient, temperature delta, actual current, etc.

In the example shown in FIG. 15, given these inputs, the process continues by computing battery load predictions (motor, aux, charging power, etc.). The process continues by verifying if higher power is needed (charge/discharge). If affirmative, the process computes a target temperature Th (preferably around 40° C.) and the time to reach it, by using inputs from Tables obtained through experimentation and Electrochemical & Thevenin models. The process then continues by controlling and measuring for example coolant, module, and cell temperatures. The process further continues by controlling charging power based on thermal data and battery impedance. The process then closely monitors safety critical parameters (temperature, gradient, Δ, Z, etc.), after which it returns to the step of computing battery load predictions (motor, aux, charging power, etc.) and verifying if high power is needed (charge/discharge). If negative, the process continues by computing the target temperature Tn (preferably around 25° C.) and corresponding SOP. The process then controls and measures for example coolant, module, and cell temperatures. The process continues by returning to the step of computing battery load predictions (motor, aux, charging power, etc.) and verifying if high power is needed (charge/discharge).

The scope of the claims should not be limited by the preferred embodiments set forth in the examples, but should be given the broadest interpretation consistent with the description as a whole.

Definitions

The use of the terms "a" and "an" and "the" and similar referents in the context of describing the invention (especially in the context of the following claims) are to be construed to cover both the singular and the plural, unless otherwise indicated herein or clearly contradicted by context.

The terms "comprising", "having", "including", and "containing" are to be construed as open-ended terms (i.e., meaning "including, but not limited to") unless otherwise noted.

Recitation of ranges of values herein are merely intended to serve as a shorthand method of referring individually to each separate value falling within the range, unless otherwise indicated herein, and each separate value is incorporated into the specification as if it were individually recited herein. All subsets of values within the ranges are also incorporated into the specification as if they were individually recited herein.

All methods described herein can be performed in any suitable order unless otherwise indicated herein or otherwise clearly contradicted by context.

The use of any and all examples, or exemplary language (e.g., "such as") provided herein, is intended merely to better illuminate the invention and does not pose a limitation on the scope of the invention unless otherwise claimed.

No language in the specification should be construed as indicating any non-claimed element as essential to the practice of the invention.

Herein, the term "about" has its ordinary meaning. In embodiments, it may mean plus or minus 10% or plus or minus 5% of the numerical value qualified.

Unless otherwise defined, all technical and scientific terms used herein have the same meaning as commonly understood by one of ordinary skill in the art to which this invention belongs.

The invention claimed is:

1. A battery module comprising a plurality of cells and a casing comprising one or more cell-containing layers configured to house the cells, the casing further comprising one or more cooling layers, such that each cooling layer is configured to contain partial immersion cooling means in such a manner that said partial immersion cooling means are positioned directly around at least one electrode of the cells, wherein the plurality of cells comprises two layers of cells contained in two cell-containing layers of the casing, and wherein the casing comprises three cooling layers configured to contain partial immersion cooling means, the first cooling layer being a top layer configured to cool cathodes of the first layer of cells, the second cooling layer being a middle layer located between the two cell-containing layers and configured to cool anodes of both layers of cells, and the third cooling layer being a bottom layer configured to cool cathodes of the second layer of cells, wherein said second cooling layer comprises an insulated plate configured to separate the two layers of cells.

2. The battery module of claim 1, wherein each cooling layer comprises a layer of sealing material comprising apertures that are dimensioned so as to sealingly receive the cells in such a manner that the cells come into direct contact with the partial immersion cooling means without the partial immersion cooling means leaking out of the cooling layer.

3. The battery module of claim 1, wherein the casing comprises at least two cooling layers, wherein one of said at least two cooling layers is at a top of the casing and another of said at least two cooling layers is at a bottom of said casing.

4. The battery module of claim 1, wherein the casing further comprises at least one holder to better secure the plurality of cells.

5. The battery module of claim 1, wherein the partial immersion cooling means comprises dielectric liquid.

6. The battery module of claim 1, wherein the battery module further comprises at least one of a PCB-current collector; one or more sensors; or one or more other PCBs (MMU/BMU/BMS).

7. The battery module of claim 1, wherein each cooling layer comprises at least one port for circulating the partial immersion cooling means.

8. The battery module of claim 1, wherein the battery module is configured to be operatively connected to a HVAC system external to the battery module.

9. The battery module of claim 1, wherein the plurality of cells are electrically connected to each other on one side by means of ultrasonic welding, wire-bonding, or laser welding.

10. The battery module of claim 1, wherein each cell anode is immersed in the partial immersion cooling means up to 3-6 mm in height and each cell cathode is immersed in the partial immersion cooling means up to 10-15 mm in height.

11. The battery module of claim 1, wherein at least one of the one or more cooling layers comprises micro cooling channels.

12. The battery module of claim 1, wherein at least one of the one or more cell-containing layers is filled with helium.

13. The battery module of claim 1, wherein the battery module is configured to be connected to other battery modules and/or to a central system using an HV and LV electrical interface.

14. The battery module of claim 1, wherein a series configuration of the cells is between 24 and 29 cells connected in series.

15. A battery pack comprising at least one module as defined in claim 1.

16. A battery pack thermal management system for a vehicle comprising at least one of the battery modules defined in claim 1, and a battery controller with software algorithms configured to control the thermal management of the cells of the at least one battery module.

17. A system battery pack thermal management system for a vehicle comprising at least one of the battery module comprising a plurality of cells and a casing comprising one or more cell-containing layers configured to house the cells, the casing further comprising one or more cooling layers, such that each cooling layer is configured to contain partial immersion cooling means in such a manner that said partial immersion cooling means are positioned directly around at least one electrode of the cells, and a battery controller with software algorithms configured to control the thermal management of the cells of the at least one battery module, wherein the system is configured to cool anodes of the cells independently of cathodes of the cells, and to cool cathodes of the cells independently of anodes of the cells.

18. A method of controlling the cell temperature of a battery module using a battery pack thermal management system for a vehicle comprising at least one of the battery module comprising a plurality of cells and a casing comprising one or more cell-containing layers configured to house the cells, the casing further comprising one or more cooling layers, such that each cooling layer is configured to contain partial immersion cooling means in such a manner that said partial immersion cooling means are positioned directly around at least one electrode of the cells, and a battery controller with software algorithms configured to control the thermal management of the cells of the at least one battery module, said method comprising the steps of:
  predicting, using the software algorithms, the battery power necessary to operate or recharge the vehicle,
  assigning, using the software algorithms, the right temperature profile to the cells to maximize efficiency and/or minimize resistance/impedance; and
  modifying, using the software algorithms, the temperature of the cooling means of the battery module based on the results of the assignment step.

19. The method according to claim 18, wherein the method further comprises the step of controlling, using the software algorithms, the power output and voltage sag of the battery module so as to decrease an internal resistance.

20. A battery module comprising:
  a plurality of cells, each cell comprising a central body, an anode and a cathode,
  a casing for housing the cells, the casing comprising at least one thermal management layer,
  wherein the thermal management layer comprises at least one port for circulating a fluid,
  wherein the fluid is configured to be recirculated and actively heated or cooled by an external thermal management system,
  wherein the thermal management layer containing the fluid is positioned directly on the anode or cathode of each of the cells up to a predetermined maximum depth so that the anode or cathode of each of the cells is immersed in said fluid up to the maximum predetermined depth, whereas the central body of each cell is not in contact radially with the fluid.

21. The battery module of claim 20, wherein each thermal management layer comprises a layer of sealing material comprising apertures that are dimensioned so as to sealingly receive the cells in such a manner that the cells come into direct contact with the fluid without the fluid leaking out of the thermal management layer.

22. The battery module of claim 20, wherein the casing comprises at least two thermal management layers, wherein one of said at least two thermal management layers is at a top of the casing and another of said at least two cooling layers is at a bottom of said casing.

23. The battery module of claim 20, wherein the casing further comprises at least one holder for securing the plurality of cells.

24. The battery module of claim 20, wherein the fluid comprises dielectric liquid.

25. The battery module of claim 20, further comprising at least one of a printed circuit board current collector; one or more sensors; and one or more other printed circuit boards.

26. The battery module of claim 20, wherein the external thermal management system comprises a HVAC system.

27. The battery module of claim 20, wherein the plurality of cells are electrically connected to each other by means of ultrasonic welding, wire-bonding, or laser welding.

28. The battery module of claim 20, wherein each cell anode is immersed in the fluid up to 3-6 mm in depth and each cell cathode is immersed in the fluid up to 10-15 mm in depth.

29. The battery module of claim 20, wherein the thermal management layer comprises micro cooling channels.

30. The battery module of claim 20, wherein the at least one thermal management layer comprises a top thermal management layer and a bottom thermal management layer, and a central layer is located between the top and bottom thermal management layers, and wherein the central layer is filled with helium.

31. The battery module of claim 20, wherein the plurality of cells comprises two layers of cells contained in two cell-containing layers of the casing, and wherein the casing comprises three thermal management layers configured to contain the fluid, the first thermal management layer being a top layer configured to cool cathodes of the first layer of cells, the second thermal management layer being a middle layer located between the two cell-containing layers and configured to cool anodes of both layers of cells, and the third thermal management layer being a bottom layer configured to cool cathodes of the second layer of cells, wherein said second thermal management layer comprises an insulated plate configured to separate the two layers of cells.

32. The battery module of claim 20, wherein the battery module is configured to be connected to other battery modules and/or to a central system using a high voltage and a low voltage electrical interface.

33. The battery module of claim 20, wherein the cells are connected in series.

34. A battery pack comprising at least one module as defined in claim 20.

35. A battery pack thermal management system for a vehicle comprising the battery module defined in claim 21, and a battery controller connectable to the external thermal management system for controlling a thermal management of the cells of the battery module.

36. A method of controlling a cell temperature of the battery module of claim 20 using the battery pack thermal management system of claim 35, said method comprising the steps of:
- predicting a battery power necessary to operate or recharge the vehicle, assigning a temperature profile to the cells to maximize efficiency and/or minimize resistance/impedance, and
- modifying a temperature of the fluid of the battery module based on the results of the assignment step.

37. The method according to claim 36, wherein the method further comprises a step of controlling a power output and voltage sag of the battery module so as to decrease an internal resistance.

\* \* \* \* \*